(12) United States Patent
Takeda et al.

(10) Patent No.: US 10,995,412 B2
(45) Date of Patent: May 4, 2021

(54) ELECTRODES FOR CHEMICAL REACTION, AND CELL FOR CHEMICAL REACTION AND CHEMICAL REACTOR USING THE SAME

(71) Applicant: KABUSHIKI KAISHA TOYOTA CHUO KENKYUSHO, Nagakute (JP)

(72) Inventors: Yasuhiko Takeda, Nagakute (JP); Takeshi Morikawa, Nagakute (JP); Naohiko Kato, Nagakute (JP); Shintaro Mizuno, Nagakute (JP); Masahito Shiozawa, Nagakute (JP); Hiroaki Wakayama, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 16/298,547

(22) Filed: Mar. 11, 2019

(65) Prior Publication Data
US 2019/0284706 A1 Sep. 19, 2019

(30) Foreign Application Priority Data
Mar. 13, 2018 (JP) .............................. JP2018-045081

(51) Int. Cl.
| | | |
|---|---|---|
| C25B 15/02 | (2021.01) |
| C25B 3/04 | (2006.01) |
| C25B 9/00 | (2021.01) |
| C25B 9/16 | (2006.01) |
| C25B 1/55 | (2021.01) |
| C25B 1/04 | (2021.01) |
| C25B 3/25 | (2021.01) |
| C25B 9/17 | (2021.01) |
| C25B 9/70 | (2021.01) |

(52) U.S. Cl.
CPC ............... *C25B 1/55* (2021.01); *C25B 1/04* (2013.01); *C25B 3/25* (2021.01); *C25B 9/17* (2021.01); *C25B 9/70* (2021.01)

(58) Field of Classification Search
CPC .. C25B 9/18; C25B 15/02; C25B 9/00; C25B 3/04; C25B 9/045; C25B 9/16; C25B 9/206
See application file for complete search history.

(56) References Cited

U.S. PATENT DOCUMENTS

| | | | | |
|---|---|---|---|---|
| 2007/0212665 A1* | 9/2007 | Jimenez | ................. | A61C 17/00 433/215 |
| 2016/0141537 A1* | 5/2016 | Harrabi | ............... | H01L 51/5225 257/749 |
| 2018/0209053 A1* | 7/2018 | Tamura | ................... | C25B 1/003 |

FOREIGN PATENT DOCUMENTS

| | | |
|---|---|---|
| JP | 2013-253270 A | 12/2013 |
| JP | 2013-253294 A | 12/2013 |

OTHER PUBLICATIONS

Reece et al. "Wireless Solar Water Splitting Using Silicon-Based Semiconductors and Earth-Abundant Catalysts." Science, Nov. 4, 2011, vol. 334, pp. 645-648.

(Continued)

*Primary Examiner* — Zulmariam Mendez
(74) *Attorney, Agent, or Firm* — Oliff PLC

(57) ABSTRACT

An electrode set for chemical reaction includes a substrate, and electrodes for reduction and oxidation reactions alternately arranged on the same surface of the substrate.

18 Claims, 22 Drawing Sheets

(56) References Cited

OTHER PUBLICATIONS

Arai et al. "A monolithic device for CO2 photoreduction to generate liquid organic substances in a single-compartment reactor." Energy & Environmental Science, 2015, vol. 8, pp. 1998-2002.

Becker et al. "A modular device for large area integrated photoelectrochemical water-splitting as a versatile tool to evaluate photoabsorbers and catalysts." Journal of Materials Chemistry A, Mar. 14, 2017, vol. 5, No. 10, pp. 4818-4826 with 5 pages of Supplemental Information.

Peharz et al. "Solar hydrogen production by water splitting with a conversion efficiency of 18%." International Journal of Hydrogen Energy, 2007, vol. 32, pp. 3248-3252.

Yoshikawa et al. "Silicon heterojunction solar cell with interdigitated back contacts for a photoconversion efficiency over 26%." Nature Energy, Mar. 20, 2017, vol. 2, Article No. 17032.

Aug. 18, 2020 Office Action issued in Japanese Patent Application No. 2018-045081.

Mar. 17, 2020 Office Action issued in Japanese Patent Application No. 2018-045081.

\* cited by examiner

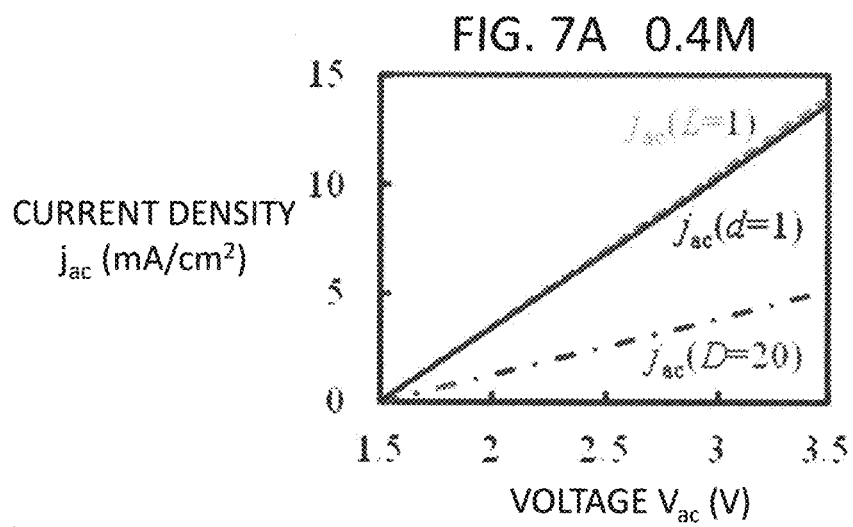
FIG. 7A 0.4M
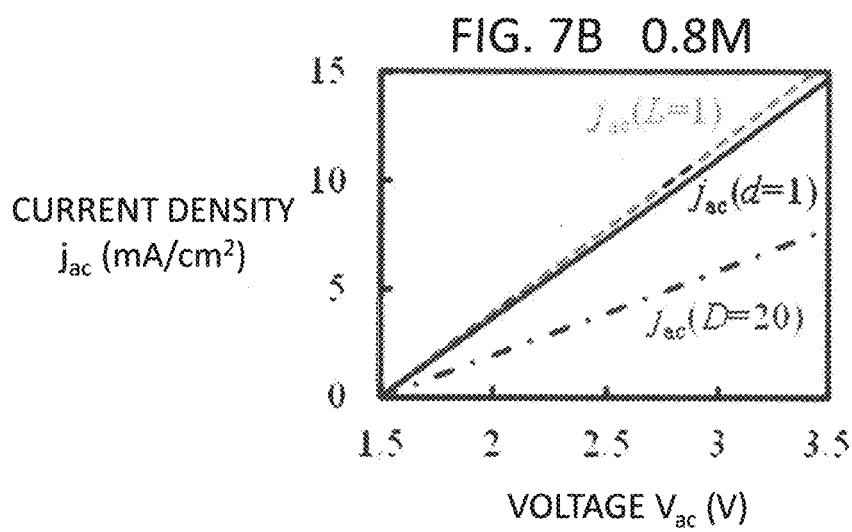
FIG. 7B 0.8M
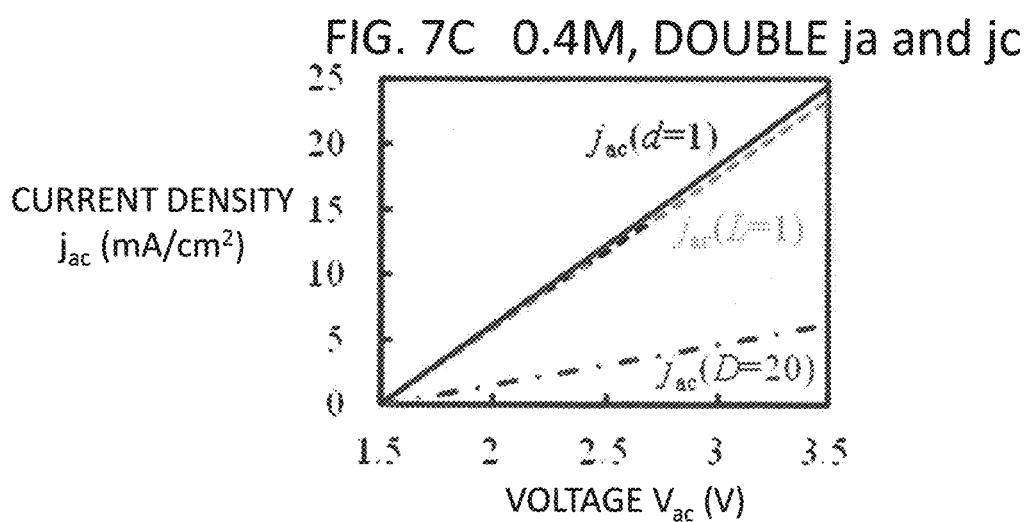
FIG. 7C 0.4M, DOUBLE ja and jc

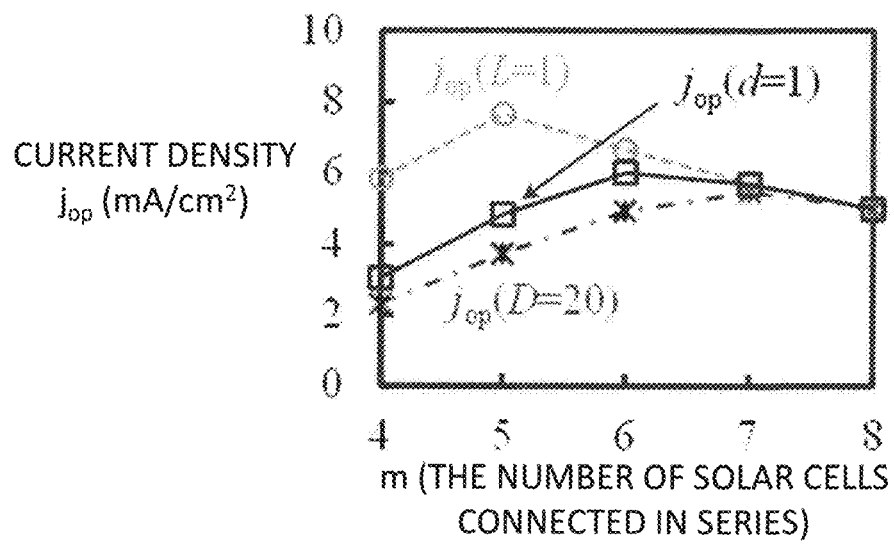
FIG. 12A  0.4M, 1sun
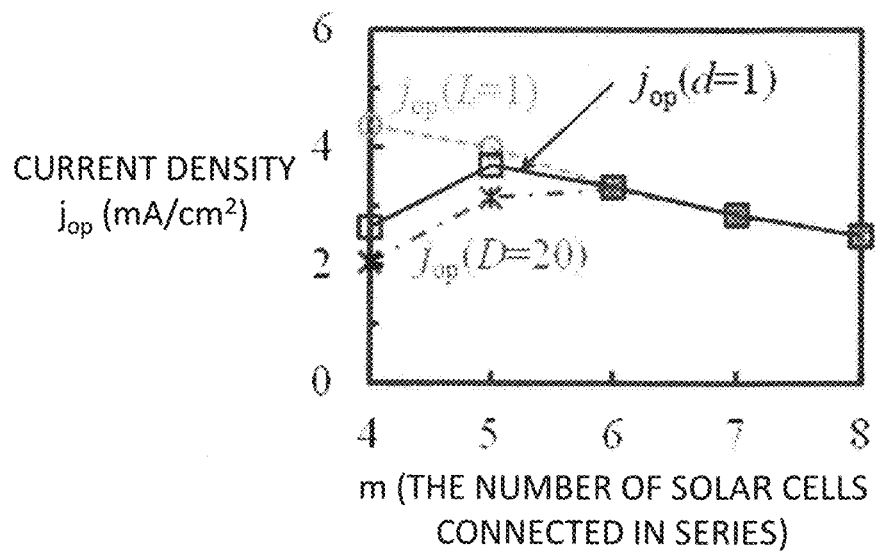
FIG. 12B  0.4M, 0.5sun

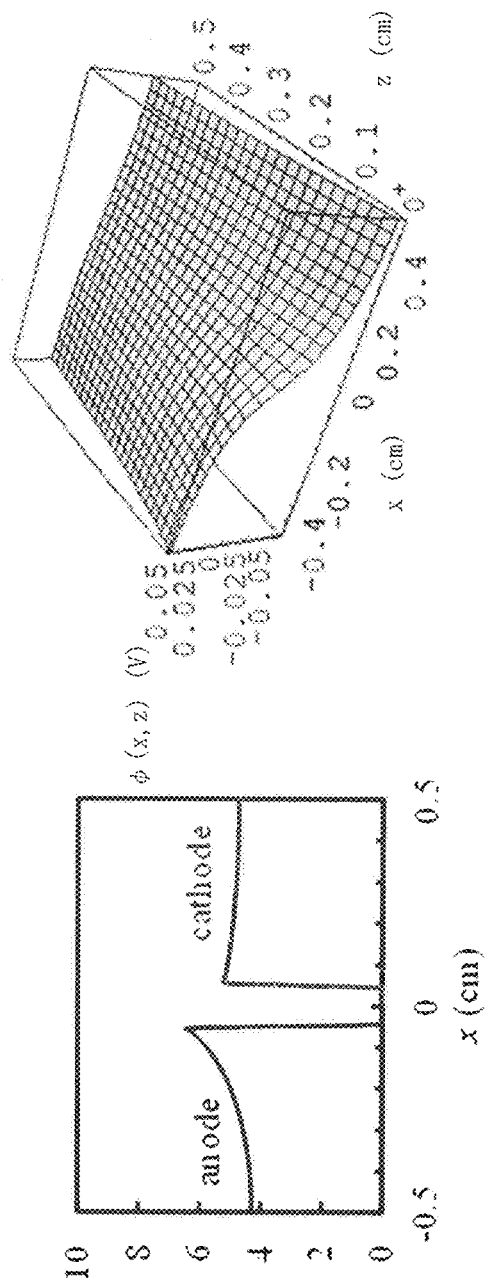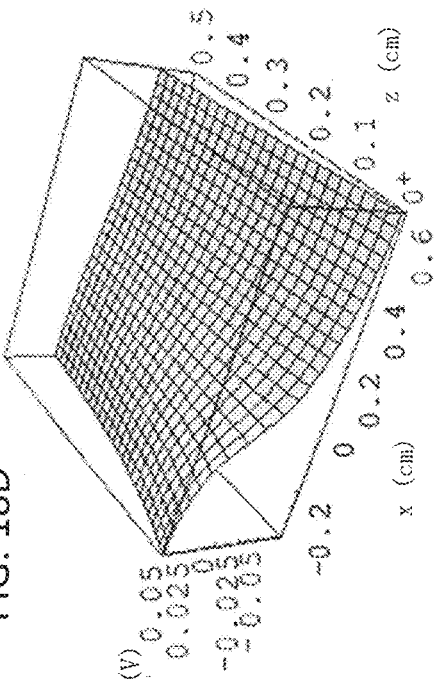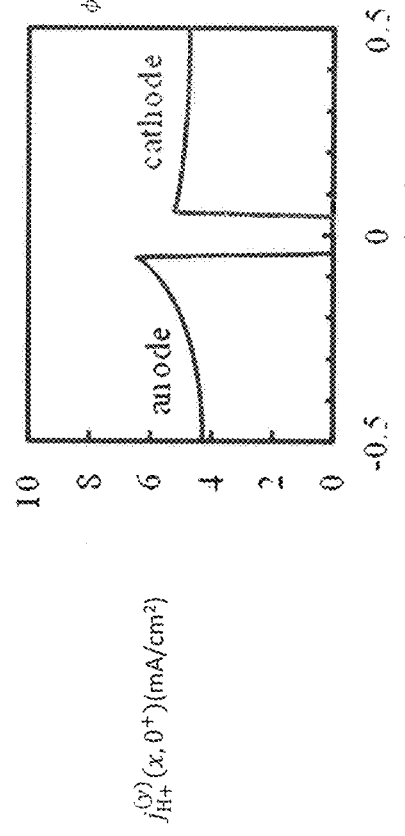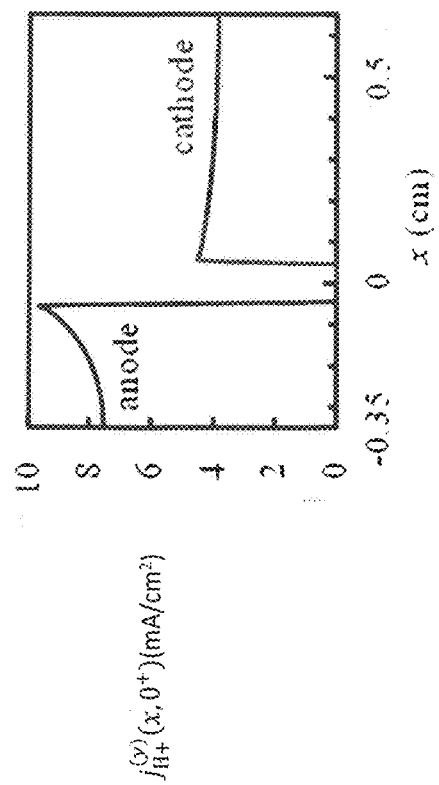
FIG. 18A
FIG. 18B
FIG. 18C
FIG. 18D

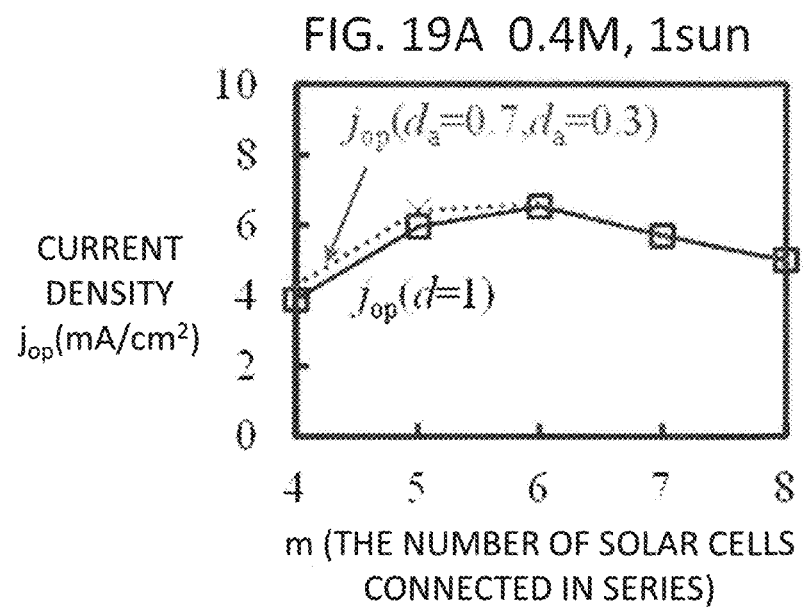
FIG. 19A 0.4M, 1sun
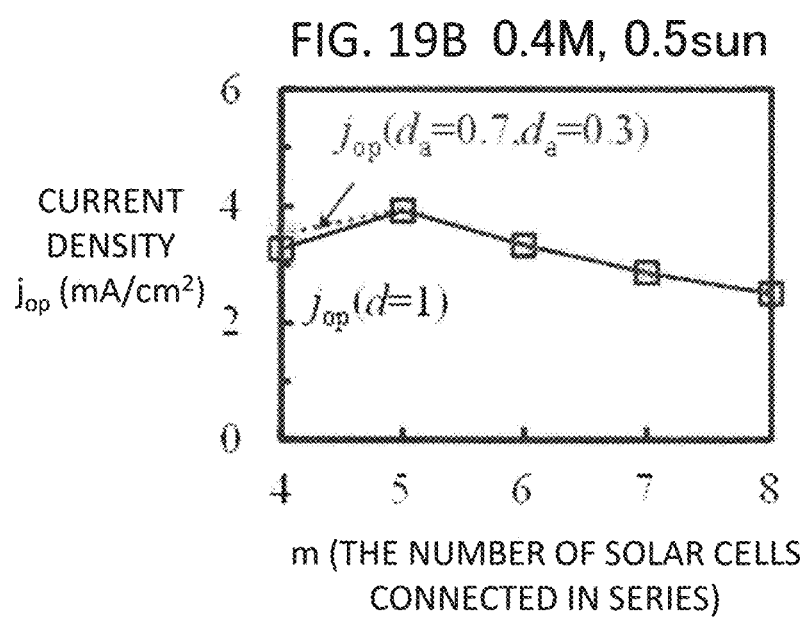
FIG. 19B 0.4M, 0.5sun

ELECTRODES FOR CHEMICAL REACTION, AND CELL FOR CHEMICAL REACTION AND CHEMICAL REACTOR USING THE SAME

CROSS REFERENCE TO RELATED APPLICATION

This application claims priority to Japanese Patent Application No. 2018-045081 filed on Mar. 13, 2018, which is incorporated herein by reference in its entirety including the specification, claims, drawings, and abstract.

TECHNICAL FIELD

The present disclosure relates to an electrode for chemical reaction, and to a cell for chemical reaction and a chemical reactor using the same.

BACKGROUND

Artificial photosynthesis technologies for synthesizing hydrogen ($H_2$) from water ($H_2O$) and synthesizing carbon monoxide (CO), formic acid (HCOOH), methanol ($CH_3OH$), and so on from water ($H_2O$) and carbon dioxide ($CO_2$) have been disclosed. In order to realize artificial photosynthesis, it is necessary to apply a potential difference of 2 V to 3 V between an electrode for oxidation reaction and an electrode for reduction reaction. In order to realize this, on both surfaces of each amorphous silicon based triple-junction solar cell (a-Si 3J-SC), photoelectrodes having an oxidation-reduction catalyst supported thereon are used. Also, there are used artificial photosynthesis cells formed by forming an electrode for reduction reaction by supporting a reduction catalyst on the rear surface (the opposite side to the light incident surface) of an amorphous silicon based triple-junction solar cell, and disposing an electrode for oxidation reaction including a member having an oxidation catalyst function so as to face the electrode for reduction reaction, and connecting the electrodes to the front electrodes of the solar cell; i.e., by integrating solar cells and electrochemical cells. Sometimes, for higher efficiency, facing-type cells are configured with III-V compound dual-junction solar cells (III-V 2J-SC).

Incidentally, in order to achieve high conversion efficiency, it is desirable to set the distance between an electrode for oxidation reaction and an electrode for reduction reaction short such that protons can smoothly flow from the electrode for oxidation reaction to the electrode for reduction reaction.

However, in each integrated-type cell for chemical reaction which is formed by providing an electrode for oxidation reaction on one surface of a solar cell and providing an electrode for reduction reaction on the other surface, since protons need to move in an electrolytic solution via an end part of each cell, there is a problem that if the size of the cell is increased, the efficiency of reaction lowers. Also, in the case of each facing-type cell which is formed by disposing an electrode for oxidation reaction and an electrode for reduction reaction such that they face each other, if the distance between the electrode for oxidation reaction and the electrode for reduction reaction is short, it is difficult to uniformly circulate a sufficient amount of electrolytic solution to supply a sufficient amount of raw materials and quickly discharge products.

SUMMARY

Solution to Problem

One aspect of the present disclosure is directed to an electrode set for chemical reaction, including a substrate, and electrodes for oxidation and reduction reactions alternately arranged on the same surface of the substrate.

In this aspect, the electrodes for oxidation and reduction reactions may each have a width of 4 cm or less in the direction in which the electrodes are alternately arranged.

Another aspect of the present disclosure is directed to a cell for chemical reaction, including a combination of the electrode for oxidation reaction and at least one solar cell connected to the electrode for reduction reaction.

In this aspect, the solar cell may be an integrated part of the substrate.

In addition, the at least one solar cell may include three to six crystalline silicon solar cells connected in series.

The cell for chemical reaction may also be immersed in an electrolytic solution.

A further aspect of the present disclosure is directed to a chemical reactor including a plurality of the cells for chemical reaction defined above, in which the electrodes for oxidation and reduction reactions are provided on one or both surfaces of each of the cells, and the surfaces on which the electrodes are provided are arranged facing each other.

Advantageous Effects of Disclosure

The present disclosure enables provision of chemical reaction electrodes that allow easy movement of electrons and allow circulation of an electrolytic solution in a sufficient amount to supply raw materials and to discharge products, and also enables provision of a chemical reaction cell and a chemical reactor each including such electrodes.

BRIEF DESCRIPTION OF DRAWINGS

Embodiment(s) of the present disclosure will be described by reference to the following figures, wherein:

FIG. 7A is a view illustrating the relationship between current density and voltage in each of cells for chemical reaction;

FIG. 7B is a view illustrating the relationship between current density and voltage in each of cells for chemical reaction;

FIG. 7C is a view illustrating the relationship between current density and voltage in each of cells for chemical reaction;

FIG. 12A is a view illustrating the relationship between the number of solar cells which are connected in series and current density at each operating point;

FIG. 12B is a view illustrating the relationship between the number of solar cells which are connected in series and current density at each operating point;

FIG. 18A is a view illustrating local proton current density and variation in potential $\varphi(x, z)$ attributable to specific resistance $\rho_{H+}$, obtained when a resistance component according to proton propagation was considered as an ohmic resistor, in a cell for chemical reaction;

FIG. 18B is a view illustrating the local proton current density and the variation in potential $\varphi(x, z)$ attributable to specific resistance $\rho_{H+}$, obtained when a resistance component according to proton propagation was considered as an ohmic resistor, in the cell for chemical reaction;

FIG. 18C is a view illustrating local proton current density and variation in potential $\varphi(x, z)$ attributable to specific resistance $\rho_{H+}$, obtained when a resistance component according to proton propagation was considered as an ohmic resistor, in a cell for chemical reaction;

FIG. 18D is a view illustrating local proton current density and variation in potential $\varphi(x, z)$ attributable to specific resistance $\rho_{H+}$, obtained when a resistance component according to proton propagation was considered as an ohmic resistor, in the cell for chemical reaction;

FIG. 19A is a view illustrating the relationship between the number of solar cells connected in series and current density at each operating point;

FIG. 19B is a view illustrating the relationship between the number of solar cells connected in series and current density at each operating point;

DESCRIPTION OF EMBODIMENTS

Figure 1:
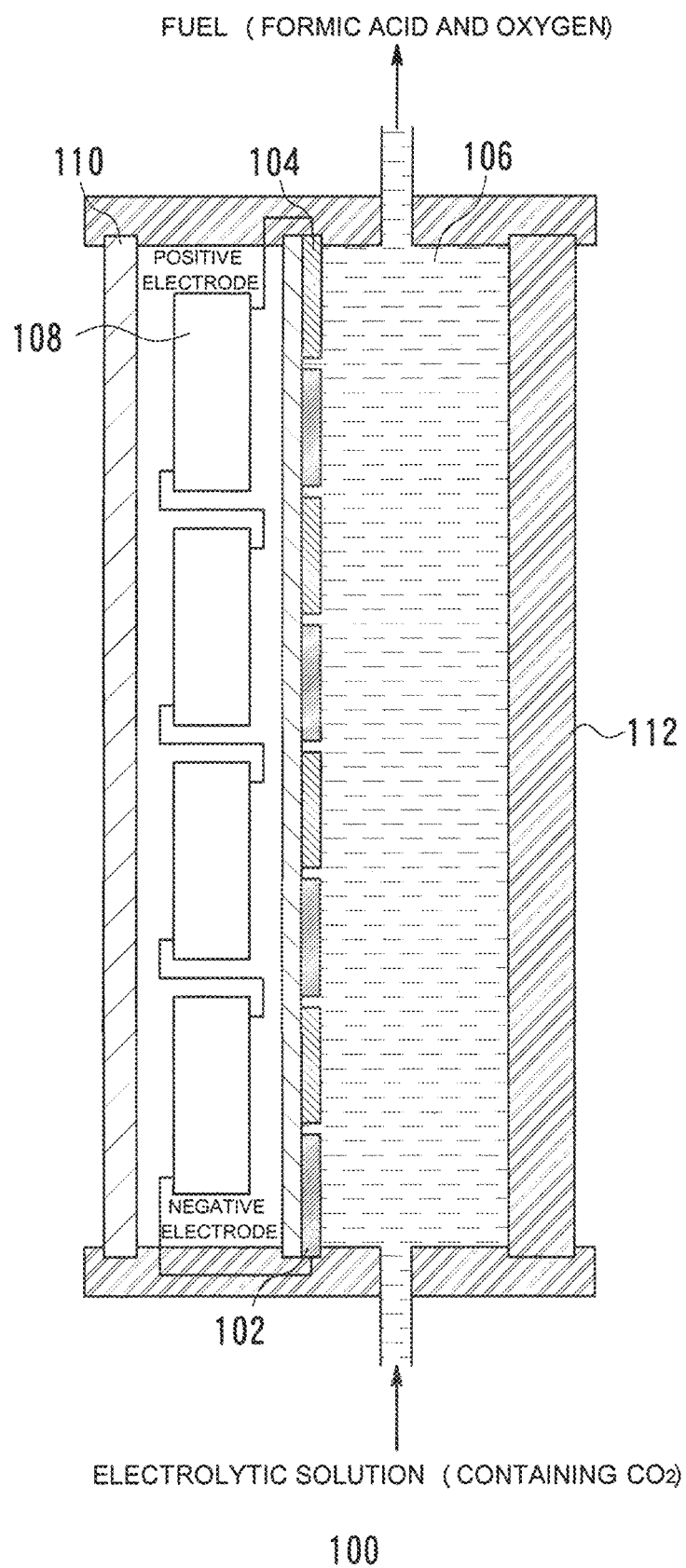
FIG. 1 is a view illustrating the configuration of a chemical reactor according to an embodiment of the present disclosure.

As shown in a schematic diagram of FIG. 1, a chemical reactor 100 according to an embodiment is configured to include an electrode 102 for reduction reaction, an electrode 104 for oxidation reaction, an electrolytic solution 106, solar cells 108, a window member 110, and a frame member 112.

Figure 2:
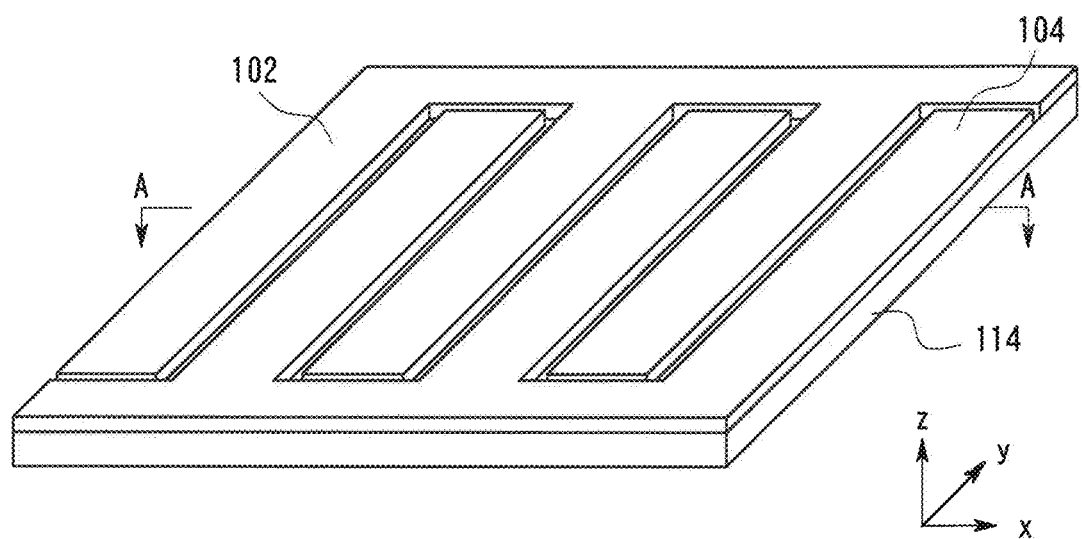
FIG. 2 is a perspective view illustrating the configuration of an electrode for reduction reaction and an electrode for oxidation reaction according to the embodiment of the present disclosure.
Figure 3:
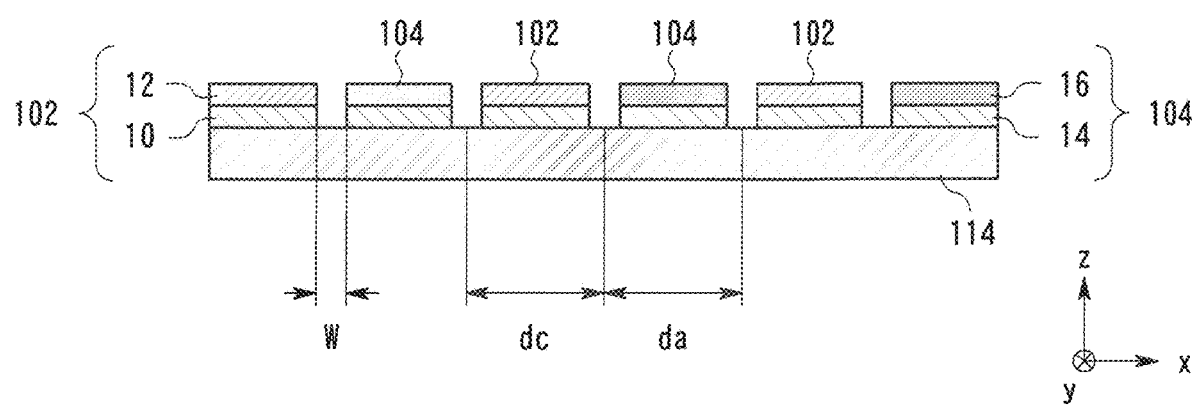
FIG. 3 is a cross-sectional view illustrating the configuration of the electrode for reduction reaction and the electrode for oxidation reaction according to the embodiment of the present disclosure.

FIG. 2 and FIG. 3 are a perspective view and a cross-sectional view illustrating the configuration of the electrode 102 for reduction reaction and the electrode 104 for oxidation reaction. FIG. 3 is a cross-sectional view taken along a line A-A of FIG. 2. However, in FIG. 2 and FIG. 3, in order to clearly show the structures of the electrode 102 for reduction reaction and the electrode 104 for oxidation reaction, the individual parts are shown in sizes different from the actual sizes.

In the present embodiment, the electrode 102 for reduction reaction and the electrode 104 for oxidation reaction are arranged on the same surface of a substrate 114 so as to be interdigitated. Specifically, as shown in FIG. 2 and FIG. 3, the electrode 102 for reduction reaction and the electrode 104 for oxidation reaction need to be arranged such that their toothed strips extending in a y direction are alternately positioned in an x direction. In this case, as shown in FIG. 2, since ends of the toothed strips of each of the electrode 102 for reduction reaction and the electrode 104 for oxidation reaction are connected, the electrode 102 for reduction reaction and the electrode 104 for oxidation reaction formed in comb shapes are interdigitated.

Here, the configuration in which the electrode 102 for reduction reaction and the electrode 104 for oxidation reaction are interdigitated is not limited to the configuration in which the toothed strips are arranged linearly as shown in FIG. 2. For example, it is also possible to arrange an electrode 102 for reduction reaction having toothed strips having a spiral shape, and an electrode 104 for oxidation reaction having toothed strips having a spiral shape, on the same surface of the substrate 114, such that their toothed strips are interdigitated. Also, for example, as long as the toothed strips of an electrode 102 for reduction reaction and an electrode 104 for oxidation reaction are arranged side by side on the same surface of the substrate 114, their shapes may be indefinite shapes.

The electrode 102 for reduction reaction is an electrode for reducing substances by reduction reaction. The electrode 102 for reduction reaction is formed on the substrate 114 as shown in the cross-sectional view of FIG. 3. The electrode 102 for reduction reaction is configured to include a conductive layer 10 and a conductor layer 12.

The substrate 114 is a member for structurally supporting the electrode 102 for reduction reaction. In the present embodiment, the substrate 114 is shared with the electrode 104 for oxidation reaction. The material for the substrate 114 is not particularly limited, and for example, a glass substrate and so on can be used. Also, the substrate 114 may contain, for example, a metal or a semiconductor. Metals usable as the substrate 114 are not particularly limited. Semiconductors usable as the substrate 114 are not particularly limited. In the case where the substrate 114 contains a metal or a semiconductor, between the electrode 102 for reduction reaction and the electrode 104 for oxidation reaction and the substrate 114, an insulating layer is formed. The insulating layer is not particularly limited, and can be formed of an oxide semiconductor, a nitride semiconductor, a resin, or the like.

The conductive layer 10 is formed in order to improve the collecting efficiency of the electrode 102 for reduction reaction. The conductive layer 10 is not particularly limited, and may be a transparent conductive layer which is formed of indium tin oxide (ITO), fluorine-doped tin oxide (FTO), zinc oxide (ZnO), or the like. Particularly, in terms of thermal and chemical stability, fluorine-doped tin oxide (FTO) may be used.

The conductor layer 12 is made of a conductor containing a material having a reduction catalyst function. The conductor can be made of a material containing a carbon material (C). The size of each of structures of the carbon material may be between 1 nm and 1 μm. The carbon material may contain, for example, at least one of carbon nanotubes (CNTs), graphene, and graphite. In the case of graphene and graphite, the size may be between 1 nm and 1 μm. In the case of carbon nanotubes, the diameter may be between 1 nm and 40 nm. The conductor can be formed by mixing the carbon material in a liquid such as ethanol, applying the solution by spraying, and heating the applied mixture. Instead of spaying, spin coating may be used to apply the solution. Alternatively, without using spin coating, the solution may be directly dropped, and be dried. Also, as the material containing a carbon material, carbon paper (CP) may be used. Also, carbon paper (CP) having carbon nanotubes (CNTs) applied thereon may be used.

The conductor layer is modified by a material having a reduction function, such as a complex catalyst. As the complex catalyst, for example, a ruthenium complex may be used. As the complex catalyst, for example, [Ru{4,4'-di(1-H-1-pyrrolypropyl carbonate)-2,2'-bipyridine}(CO)(MeCN)Cl$_2$], [Ru{4,4'-di(1-H-1-pyrrolypropyl carbonate)-2,2'-bipyridine}(CO)$_2$Cl$_2$], [Ru{4,4'-di(1-H-1-pyrrolypropyl carbonate)-2,2'-bipyridine}(CO)$_2$]$_n$, [Ru {4,4'-di(1-H-1-pyrrolypropyl carbonate)-2,2'-bipyridine}(CO)(CH$_3$CN)Cl$_2$], and so on can be used.

Modification using the complex catalyst can be performed by applying a solution obtained by dissolving a complex in an acetonitrile (MeCN) solution on the conductor of the conductor layer 12. Alternatively, modification using the complex catalyst can be performed by electrolytic polymerization. Using the conductor electrode of the conductor layer 12, a glass substrate coated with fluorine-containing tin oxide (FTO), and an Ag/Ag$^+$ electrode as the working electrode, the counter electrode, and the reference electrode, respectively, a cathode current is applied such that between the working electrode and the counter electrode in an electrolytic solution containing a complex catalyst, a negative voltage relative to the Ag/Ag$^+$ electrode is obtained, and then an anode current is applied such that positive potential relative to the Ag/Ag$^+$ electrode is obtained, whereby it is possible to modify the surface of the conductor of the conductor layer 12 by the complex catalyst. As the electrolytic solution, an acetonitrile (MeCN) solution can be used, and as the electrolyte, Tetrabutylammonium perchlorate (TBAP) can be used.

The conductor layer 12 formed as described above is supported, or applied, or bonded on the conductive layer 10 constituting the electrode 102 for reduction reaction. In this way, the electrode 102 for reduction reaction including the conductive layer 10 and the conductor layer 12 is formed.

The electrode 104 for oxidation reaction is an electrode for oxidizing substances by oxidation reaction. The electrode 104 for oxidation reaction is formed on the substrate 114 as shown in the cross-sectional view of FIG. 3. The electrode 104 for oxidation reaction is configured to include a conductive layer 14 and an oxidation catalyst layer 16.

The conductive layer 14 is formed in order to improve the collecting efficiency of the electrode 104 for oxidation reaction. The conductive layer 14 is not particularly limited, and may be formed of indium tin oxide (ITO), fluorine-doped tin oxide (FTO), zinc oxide (ZnO), or the like. Particularly, in terms of thermal and chemical stability, fluorine-doped tin oxide (FTO) may be used.

The conductive layer 10 and the conductive layer 14 can be formed by forming a transparent conductive layer over the surface of the substrate 114 having the surfaces of the electrode 102 for reduction reaction and the electrode 104 for oxidation reaction formed thereon, and processing the transparent conductive layer into comb shapes according to the shapes of the electrode 102 for reduction reaction and the electrode 104 for oxidation reaction. Specifically, the transparent conductive layer may be processed by laser scribing such that an interval is formed between the electrode 102 for reduction reaction and the electrode 104 for oxidation reaction, and the electrode 102 for reduction reaction and the electrode 104 for oxidation reaction are electrically insulated from each other.

However, on the conductive layer 10 and the conductive layer 14, collector electrodes may be provided like finger electrodes and bus electrodes in order to improve the conductivity. For example, by forming bus electrodes on the substrate 114 and forming finger electrodes so as to extend from the bus electrodes, it is possible to improve the collecting functions of the conductive layer 10 and the conductive layer 14. As the collector electrodes, for example, a metal layer may be formed of silver, copper, gold, or the like. Specifically, for example, it is possible to form the collector electrodes by applying silver paste in desired shapes on the substrate 114 by screen printing, and baking the substrate. The oxidation catalyst layer 16 is formed of a material containing a material having an oxidation catalyst function. As the material having the oxidation catalyst function, for example, a material containing iridium oxide ($IrO_x$) can be used. Iridium oxide can be supported as a nanocolloid solution on the surface of the conductive layer 14 (T. Arai et al., Energy Environ. Sci 8, 1998 (2015)).

For example, an iridium oxide ($IrO_x$) nanocolloid is produced. Next, an aqueous solution of 10 wt % of sodium hydroxide (NaOH) for adjusting pH to 13 is added to 50 ml of 2 mM of an aqueous solution of 2 mM of potassium hexachloroiridate(IV) ($K_2IrCl_6$), whereby a yellow solution is obtained. Then, the yellow solution is heated at 90° C. with a hot stirrer for 20 minutes. The blue solution obtained as a result is cooled with ice-cold water for 1 hour. Then, 3 M of nitric acid ($HNO_3$) is dropped to the cooled solution (20 mL) such that pH is adjusted to 1, and the solution is stirred for 80 minutes, whereby an aqueous solution of iridium oxide ($IrO_x$) is obtained. Further, an aqueous solution of 1.5 wt % of a NaOH (1 ml to 2 ml) nanocolloid is dropped to that solution, such that the pH is adjusted to 12. The aqueous solution of the nanocolloid of iridium oxide ($IrO_x$) with the pH of 12 obtained in the above-mentioned manner is applied to the conductive layer 14, and the substrate is dried at 60° C. in a drying furnace for 40 minutes. After drying, the deposited salt is cleaned up with ultrapure water. In this way, it is possible to form the electrode 104 for oxidation reaction. However, application of the aqueous solution of the nanocolloid of iridium oxide ($IrO_x$) and drying may be repeated a plurality of times.

The chemical reactor 100 functions by introducing the electrolytic solution 106 between the electrode 102 for reduction reaction and the electrode 104 for oxidation reaction. For example, as shown in FIG. 1, the frame member 112 is disposed so as to surround the electrode 102 for reduction reaction and the electrode 104 for oxidation reaction, and the electrolytic solution 106 containing a reactant is supplied to the surfaces of the electrode 102 for reduction reaction and the electrode 104 for oxidation reaction. As the reactant, a carbide compound can be used, and for example, carbon dioxide ($CO_2$) can be used. Also, as the electrolytic solution 106, an aqueous solution of a phosphate buffer or an aqueous solution of a boric-acid buffer may be used. In a specific configuration example, a tank for supplying a phosphate buffer solution saturated with carbon dioxide ($CO_2$) is provided, and the phosphate buffer solution is supplied to the surfaces of the electrode 102 for reduction reaction and the electrode 104 for oxidation reaction by a pump, and formic acid (HCOOH) produced by reduction reaction is collected into a collecting tank provided outside.

Also, the electrode 102 for reduction reaction and the electrode 104 for oxidation reaction are electrically connected, and an appropriate bias voltage is applied. The means for applying the bias voltage is not particularly limited, and chemical batteries (including primary batteries, secondary batteries, and the like), constant-voltage sources, solar cells, and so on can be taken as examples. In this case, to the electrode 104 for oxidation reaction, the positive electrode is connected, and to the electrode 102 for reduction reaction, the negative electrode is connected.

In the present embodiment, the solar cells 108 are used. The solar cells 108 are arranged close to the electrode 102 for reduction reaction and the electrode 104 for oxidation reaction. In the example of FIG. 1, the solar cells 108 are disposed on the back side of the electrode 102 for reduction reaction and the electrode 104 for oxidation reaction, and the positive electrodes of the solar cells 108 are connected to the electrode 104 for oxidation reaction, and the negative electrodes are connected to the electrode 102 for reduction reaction.

In the case of producing formic acid (HCOOH) from carbon dioxide ($CO_2$), water ($H_2O$) is oxidized, whereby electrons and protons are supplied to the carbon dioxide ($CO_2$). Around the pH of 7, the potential for oxidizing water ($H_2O$) is 0.82 V (vs. NHE), and the potential for reducing water is −0.41 V (vs. NHE). Also, the potentials for reduction from carbon dioxide ($CO_2$) to carbon monoxide (CO), formic acid (HCOOH), and methanol ($CH_3OH$) are −0.53 V, −0.61 V, and −0.38 V, respectively. Therefore, the potential difference between the oxidation potential and the reduction potential is between 1.20 V and 1.43 V.

For the solar cells 108, the window member 110 may be provided on the light receiving surface side. The window member 110 is a member for protecting the solar cells 108. As the window member 110, a member which transmits light of a wavelength to contribute to electric power generation in the solar cells 108, such as glass or plastic, can be used. The electrode 102 for reduction reaction, the electrode 104 for oxidation reaction, the solar cells 108, and the window member 110 are structurally supported by the frame member 112.

[Examination on Electrode Structure]

The difference between the potential for oxidizing water ($H_2O$) and the potential for reduction from carbon dioxide ($CO_2$) to formic acid (HCOOH) is 1.43 eV. In order to realize artificial photosynthesis, since overvoltage for reaction is necessary, it is necessary to apply about 2 V or a higher voltage between the electrode 102 for reduction reaction and the electrode 104 for oxidation reaction.

Figure 4:
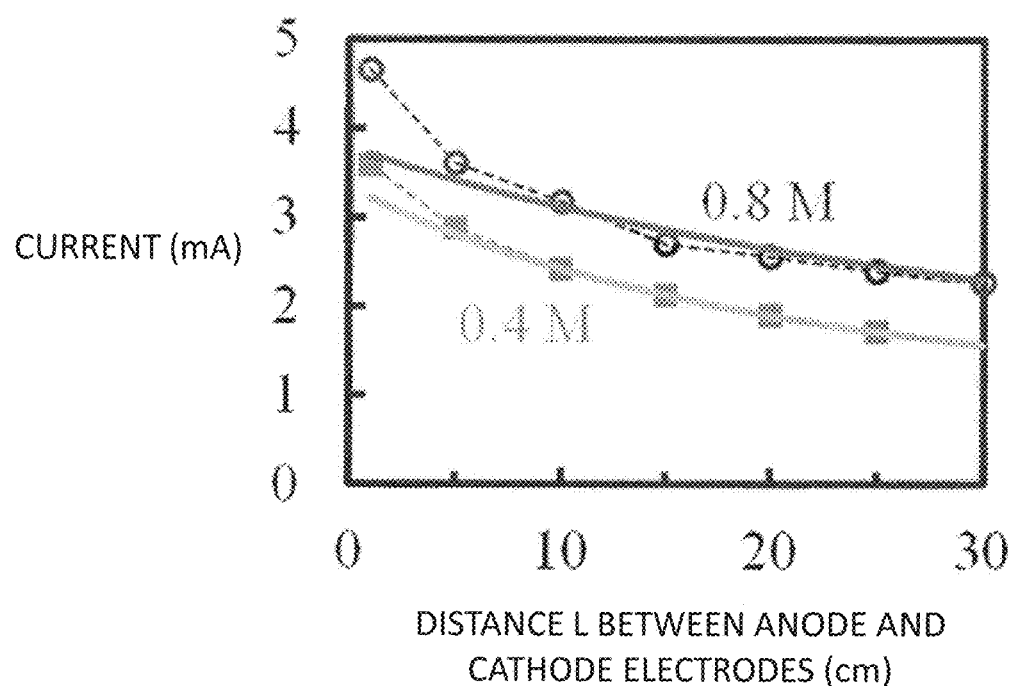
FIG. 4 is a view illustrating the dependency of current value on the distance between the electrode for reduction reaction and the electrode for oxidation reaction.

FIG. 4 shows the current value measurement result obtained by fixing an electrode for oxidation reaction (an anode) having an area of 1 $cm^2$ and supporting Ira, to a glass substrate containing fluorine-doped tin oxide $SnO_2$:F (FTO) and an electrode for reduction reaction (a cathode) having the same size; i.e., carbon paper supporting multilayer carbon nanotubes and a Ru complex polymer to the glass substrate containing fluorine-doped tin oxide $SnO_2$:F (FTO), and immersing the glass substrate in an electrolytic solution filled in a tube-shaped storage having an inside diameter of 2.5 cm, and applying a predetermined voltage of 2.5 V. The electrolytic solution is an aqueous solution of 0.4 M or 0.8 M of a phosphoric acid buffer saturated with carbon dioxide ($CO_2$). The horizontal axis represents the distance L between the electrode for oxidation reaction and the electrode for reduction reaction in the tube.

Also, in FIG. 4, circular marks (a broken line) show measurement values obtained in the case where the aqueous solution of 0.8 M of the phosphoric acid buffer was applied, and rectangular marks (a broken line) show measurement values obtained in the case where the aqueous solution of 0.4 M of the phosphoric acid buffer was applied. Solid lines show the results of fitting (to be described below) in the individual cases.

As shown in FIG. 4, as the distance L between the electrode for oxidation reaction and the electrode for reduction reaction increased, the current value decreased. In other words, it was found that the resistance component attributable to propagation of protons from the electrode for oxidation reaction to the electrode for reduction reaction is not disregardable as compared to the reaction resistance at the electrode for oxidation reaction or the electrode for reduction reaction. Therefore, in order to configure an artificial photosynthesis cell by connecting an electrode for oxidation reaction and an electrode for reduction reaction to a photocharge separation element, so as to perform conversion from solar energy into chemical energy of formic acid (HCOOH) with high efficiency, it is necessary to keep the distance between the electrode for oxidation reaction and the electrode for reduction reaction short. For this reason, in a large-sized integrated-type cell having a photocharge separation element having an electrode for oxidation reaction formed on one surface and an electrode for reduction reaction formed the other surface, it is difficult to obtain high reaction efficiency. Meanwhile, in a facing-type cell configured by arranging an electrode for oxidation reaction and an electrode for reduction reaction so as to face each other and filling an electrolytic solution therebetween such that the electrolytic solution circulates, since the distance between the electrode for oxidation reaction and the electrode for reduction reaction is limited, it is difficult to uniformly circulate a sufficient amount of electrolytic solution required to supply a sufficient amount of carbon dioxide ($CO_2$) which is a raw material and quickly discharge formic acid (HCOOH), in the large-sized cell.

<Quantitative Evaluation on Resistance Component>

Figure 5A:
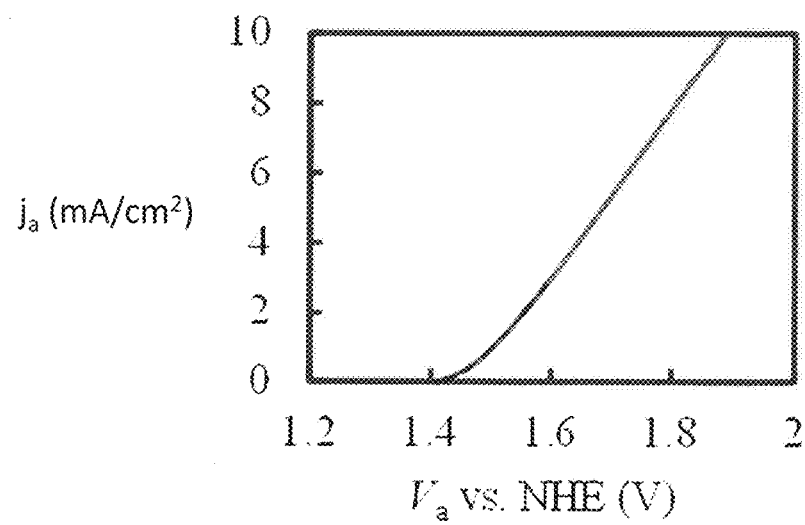
FIG. 5A is a view illustrating an example of the relationship between the current density and potential of the electrode for oxidation reaction.
Figure 5B:
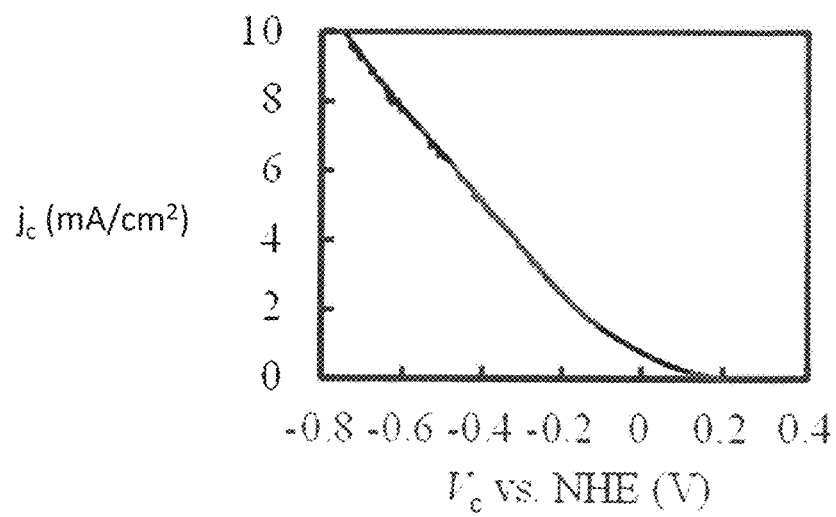
FIG. 5B is a view illustrating an example of the relationship between the current density and potential of the electrode for reduction reaction.

The resistance component attributable to propagation of protons in the electrolytic solution was quantitatively evaluated. FIG. 5A shows the current density-potential (ja-Va) characteristic of the electrode for oxidation reaction used in the above-mentioned experiment. FIG. 5B shows the current density-potential ($j_c$-$V_c$) characteristic of the electrode for oxidation reaction used as the comparative example in the above-mentioned experiment. In both cases, the concentration of the phosphoric acid buffer in the electrolytic solution was 0.4 M.

The current density-potential ($j_{ac}$-$V_{ac}$) characteristic between the electrode for oxidation reaction and the electrode for reduction reaction when the electrode for oxidation reaction and the electrode for reduction reaction are connected can be obtained by solving the system of Equation 1 and Equation 2 when the resistance component attributable to propagation of protons is considered as an ohmic resistor having a specific resistance $\rho_{H+}$.

$$j_{ac}(V_{ac})=j_a(V_a)=j_c(V_c) \quad \text{[Equation 1]}$$

$$V_{ac}=V_a-V_c+(\rho_{H+}L/(\pi 1.25^2)+\rho_0)j_{ac}(V_{ac}) \quad \text{[Equation 2]}$$

If the distance L between the electrode for oxidation reaction and the electrode for reduction reaction decreases to a value close to the inside diameter of the tube, the influence of the shapes of the tube and the electrodes increases, so the resistance component is deviated from the proportional relationship with the distance L. A parameter for correcting this deviation is $\rho_0$. When resistance $r_{H+}$ was obtained by performing fitting such that the current density $j_{ac}$ when the concentration of the phosphoric acid buffer is 0.4 M and the potential Va is 2 V equals the experimental value, the specific resistance $\rho_{H+}$ was 28 Ω·cm, and the parameter $\rho_0$ was 35Ω. As described above, if the distance L is short, Equation 2 is not established. For this reason, the fitting was performed in the range in which the distance L is equal to or larger than 10 cm. As shown in FIG. 4, the fitting result substantially coincided with the experimental value.

Also, the calculation result obtained when the concentration of the phosphoric acid buffer in the electrolytic solution was double; i.e., 0.8 M, is compared with the experimental value. However, in this case, not by fitting the experiment results obtained in the case of 0.8 M as the specific resistance $\rho_{H+}$ and the parameter $\rho_0$, values (14 Ω·cm and 17.5Ω) obtained by dividing the experiment results obtained in the case of 0.4 M by 2 were used as the specific resistance $\rho_{H+}$ and the parameter $\rho_0$ for calculation. As shown in FIG. 4, the measurement result and the fitting result obtained in the case of 0.8 M substantially coincided with each other.

It can be said from these fitting results that the resistance component attributable to propagation of protons in the electrolytic solution can be handled as an ohmic resistor whose resistance value is proportional to the concentration of the phosphoric acid buffer.

<Electrode Structure (Example) in Present Embodiment>

Hereinafter, the electrode structure in which the electrode 102 for reduction reaction and the electrode 104 for oxidation reaction having the comb shapes according to the present embodiment are combined (hereinafter, referred to as the interdigitated-type electrodes) will be examined.

Even if those electrodes are arranged such that their toothed strips are alternately positioned, the interval between the electrodes does not have a direct influence on propagation of protons. Therefore, it is only necessary to consider the influence of circulation of the electrolytic solution during design. Hereinafter, the current density-voltage ($j_{ac}$-$V_{ac}$) characteristic between the electrode 102 for reduction reaction and the electrode 104 for oxidation reaction which are the interdigitated-type electrodes will be obtained, and the influence of the widths of the electrode 102 for reduction reaction and the electrode 104 for oxidation reaction will be examined.

For simplification, the case where the length of the toothed strips of the electrode 102 for reduction reaction and the electrode 104 for oxidation reaction (in the y direction) is larger than the cycles 2d of the electrodes (in the x direction) is considered. In this case, since it is possible to disregard the influence of the ends in the longitudinal direction, the potential in the y direction becomes constant, and the current becomes zero, so it is possible to handle the influence of the widths of the electrodes as a two-dimensional issue in the x-z plane.

First, the case where the widths of the toothed strips of the electrode 102 for reduction reaction and the electrode 104 for oxidation reaction are equal is examined. Here, it is assumed that the interval between the electrode 102 for reduction reaction and the electrode 104 for oxidation reaction is w, and the width is a value obtained by subtracting ½ of the interval w from the cycle d. As described above, if the resistance component attributable to propagation of protons in the electrolytic solution (of 0.4 M of the phosphoric acid buffer) is handled as an ohmic resistor having the specific resistance $\rho_{H+}$ of 28 Ω·cm, the Poisson equation and the diffusion equation which are expressed as Equation 3 and Equation 4 are established.

$$\Delta\varphi(x,z)=0 \quad \text{[Equation 3]}$$

$$j_{H+}(x,z)=\nabla\varphi(x,z)/\rho_{H+} \quad \text{[Equation 4]}$$

Here, $\varphi(x, z)$ and $j_{(b)H+}(x, z)$ are the local potential (the relative value) and the proton current density vector at the position (x, z) respectively. Also, in this specification, in equations, vectors are shown in boldface, and in the text, vectors are shown with the subscript "(b)."

Also, it is assumed that the origin of x is the center point between the electrode 104 for oxidation reaction and the electrode 102 for reduction reaction, and the origin of z is the front surfaces of the electrode 102 for reduction reaction and the electrode 104 for oxidation reaction. Also, hereinafter, on the assumption that a virtual electrode structure in which the thicknesses of the conductor layer 12 and the oxidation catalyst layer 16 are 0, the z component at the interface between the conductive layer 10 and the conductor layer 12 and the interface between the conductive layer 14 and the oxidation catalyst layer 16 is shown as 0, and the z component at the front surfaces of the conductor layer 12 and the oxidation catalyst layer 16 is shown as 0+.

Drop in voltage attributable to reaction at the electrode 104 for oxidation reaction is expressed as Equation 5 by linearly approximating the relationship between the current density ja and the voltage Va.

$$j_{H+}{}^{(y)}(x,0^+)=j_a(\varphi(x,0)-\varphi(x,0^+)+V_{a0}), \; -d/2<x<-w/2 \quad \text{[Equation 5]}$$

Equation 5 shows the y component of a proton current density vector $j_{(b)H+}$. $\varphi(x, 0)$ is the potential of the conductive material (FTO) of the electrode 104 for oxidation reaction supporting the catalyst, and $\varphi(x, 0^+)$ represents the potential of the front surface of the catalyst. The same is true for the electrode 102 for reduction reaction.

$$j_{H+}{}^{(y)}(x,0^+)=j_c(\varphi(x,0)-\varphi(x,0^+)+V_{c0}), \; w/2<x<d/2 \quad \text{[Equation 6]}$$

Here, 1.4969 V which is obtained by subtracting $V_{c0}$ from $V_{a0}$ is the threshold voltage at which reaction occurs.

The current density $j_{ac}$ equals the density $j_{H+a}$ of the proton current flowing out from the electrode 104 for oxidation reaction and the density $j_{H+c}$ of the proton current flowing into the electrode 102 for reduction reaction.

$$j_{ac}=j_{H+a}=j_{H+c} \quad \text{[Equation 7]}$$

$$j_{H+a}=2\int_{-d/2}^{-w/2} dx \, j_{H+}{}^{(y)}(x,0^+)/d \quad \text{[Equation 8]}$$

$$j_{H+c}=2\int_{w/2}^{d/2} dx \, j_{H+}{}^{(y)}(x,0^+)/d \quad \text{[Equation 9]}$$

Figure 6A:
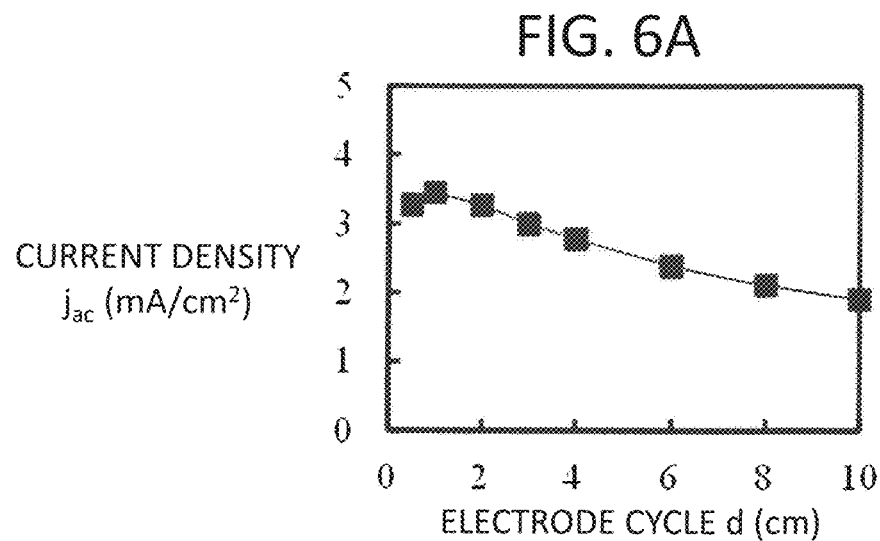
FIG. 6A is a view illustrating the relationship between current density and electrode cycle in a chemical reactor using interdigitated-type electrodes.
Figure 6B:
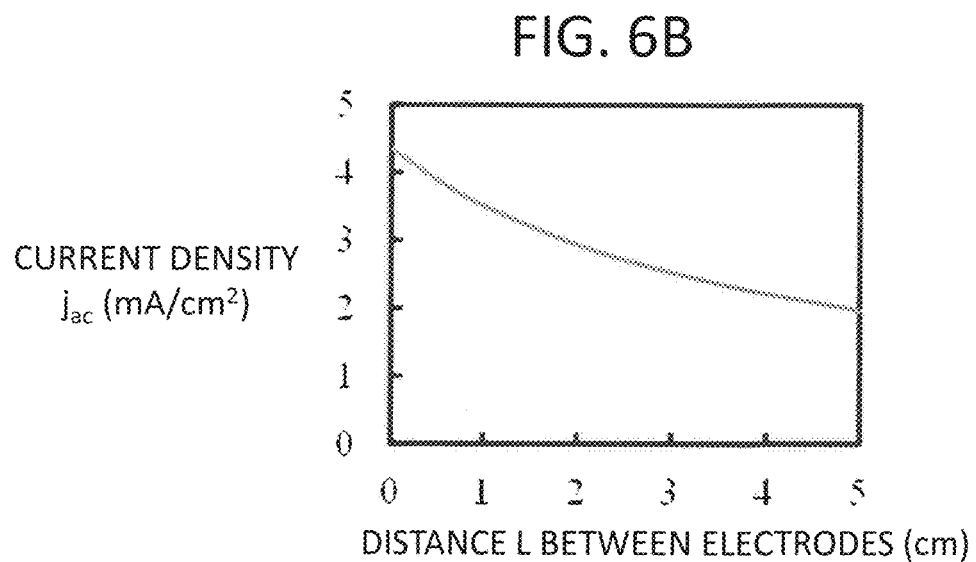
FIG. 6B is a view illustrating the relationship between current density and inter-electrode distance in a chemical reactor using facing-type electrodes.
Figure 6C:
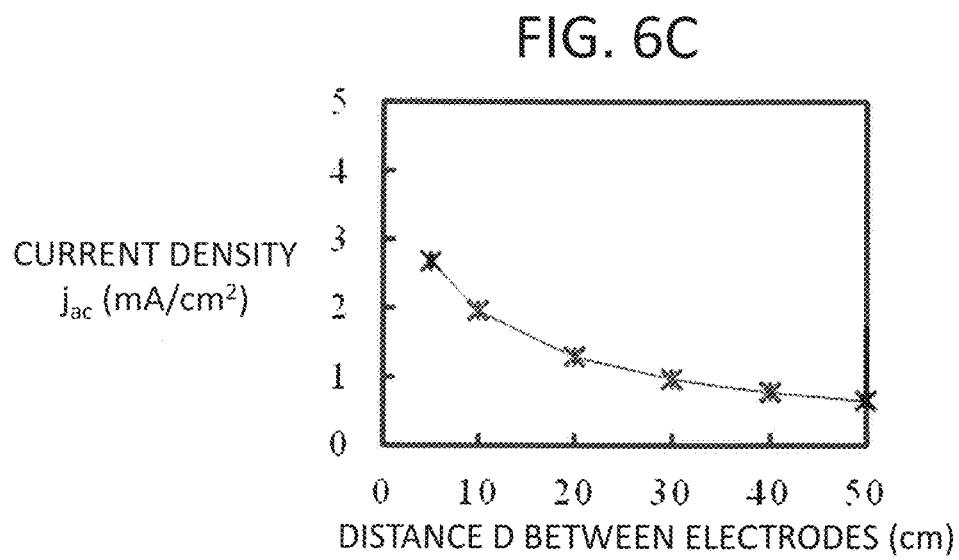
FIG. 6C is a view illustrating the relationship between current density and electrode diameter in a chemical reactor using an integrated-type electrodes according to the related art.

FIG. 6A shows the value of the current density $j_{ac}$ between the electrode 102 for reduction reaction and the electrode 104 for oxidation reaction, calculated as a function of the cycle d when 2 V was applied as the voltage Vac between the electrode 102 for reduction reaction and the electrode 104 for oxidation reaction. At that time, the interval w between the electrode 102 for reduction reaction and the electrode 104 for oxidation reaction was 0.1 cm, and the concentration of the phosphoric acid buffer was 0.4 M. FIG. 6B shows, as a comparative example, the calculation result obtained from a facing-type cell having an electrode for reduction reaction and an electrode for oxidation reaction facing each other on the assumption that an insufficient flow of electrolytic solution does not have a bad influence. FIG. 6C shows, as another comparative example, the calculation result obtained from an integrated-type cell of the related art similarly on the assumption that an insufficient flow of electrolytic solution does not have a bad influence. In this case, in order to reduce the calculation load, calculation was performed using cylindrical coordinates with respect to the disc-like cell.

When the cycle d was short, since the influence thereof was minor, and in the range in which the cycle d is equal to or smaller than 1.0 cm, the current density $j_{ac}$ between the electrode 102 for reduction reaction and the electrode 104 for oxidation reaction configured as interdigitated-type electrodes was equal to or larger than the value (3.5 mA/cm$^2$) obtained when the distance L between the facing-type electrodes was 1 cm. Also, in the range in which the cycle d is equal to or smaller than 3 cm, the current density $j_{ac}$ between the electrode 102 for reduction reaction and the electrode 104 for oxidation reaction configured as interdigitated-type electrodes was equal to or larger than the value (2.9 mA/cm$^2$) obtained when the distance L between the facing-type electrodes was 2 cm. Meanwhile, in the case of the large-sized integrated-type cell according to the related art, when the diameter D was 20 cm, the current density $j_{ac}$ decreased to 1.3 mA/cm$^2$. In contrast, in the case of the interdigitated-type electrodes, when the cycle d was 10 cm, the current density was larger than the corresponding value.

Also, as the cycle d decreases, the current value per unit area of each of the electrode 102 for reduction reaction and the electrode 104 for oxidation reaction increases. However, the ratio of the interval w in the whole increased, and thus the current density $j_{ac}$ at a cycle d of 0.5 cm was smaller than that at a cycle d of 1 cm.

From the above-described results, it can be said that if the cycle d is set to be equal to or smaller than about 3 cm, and the interval between neighboring electrodes or partitions is sufficiently secured such that a flow of an electrolytic solution is secured, it is possible to achieve high conversion efficiency. Practically, if the size of the facing type is increased, as described above, it becomes difficult to uniformly circulate a sufficient amount of electrolytic solution. Therefore, it is considered that interdigitated-type electrodes as shown in the present embodiment are superior.

FIG. 7A shows the current density-voltage ($j_{ac}$-$V_{ac}$) characteristic when the cycle d is set such that the current density $j_{ac}$ becomes maximum; i.e., when the cycle d is 1 cm. FIG.

7A to FIG. 7C each also show the result of the current density $j_{ac}$ (L=1) in the case of the facing type in which the distance L between the electrodes is 1 cm, and the current density $j_{ac}$ (D=20) in the case of the integrated type of the related art. The current density $j_{ac}$ between the interdigitated-type electrodes does not depend on the external appearances of the electrodes. Therefore, even if their sizes are increased, a value substantially equal to the current density $j_{ac}$ (L=1) in the facing type of the related art is obtained. Meanwhile, in the integrated-type electrodes of the related art, when the diameter was 20 cm, the current density $j_{ac}$ (D=20) was extremely low. It is apparent from the result of FIG. 6C that in the integrated-type electrodes of the related art, if the diameter is set to a larger value for practical use, the current density $j_{ac}$ (D) further decreases. Also, if the sizes of the facing-type electrodes are increased, a problem occurs in circulating the electrolytic solution.

Figure 8A:
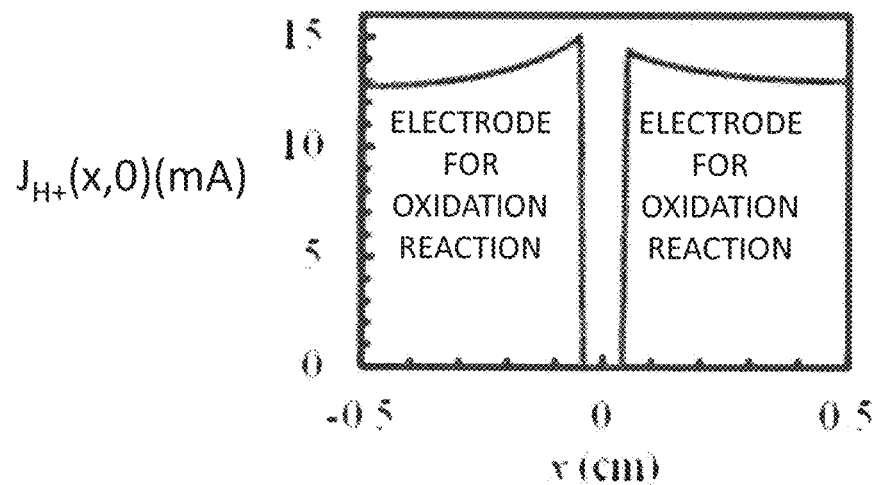
FIG. 8A is a view illustrating local proton current density and variation in potential $\varphi(x, z)$ attributable to specific resistance $\rho_{H+}$, obtained when a resistance component according to proton propagation was considered as an ohmic resistor, in a cell for chemical reaction using interdigitated-type electrodes.
Figure 8B:
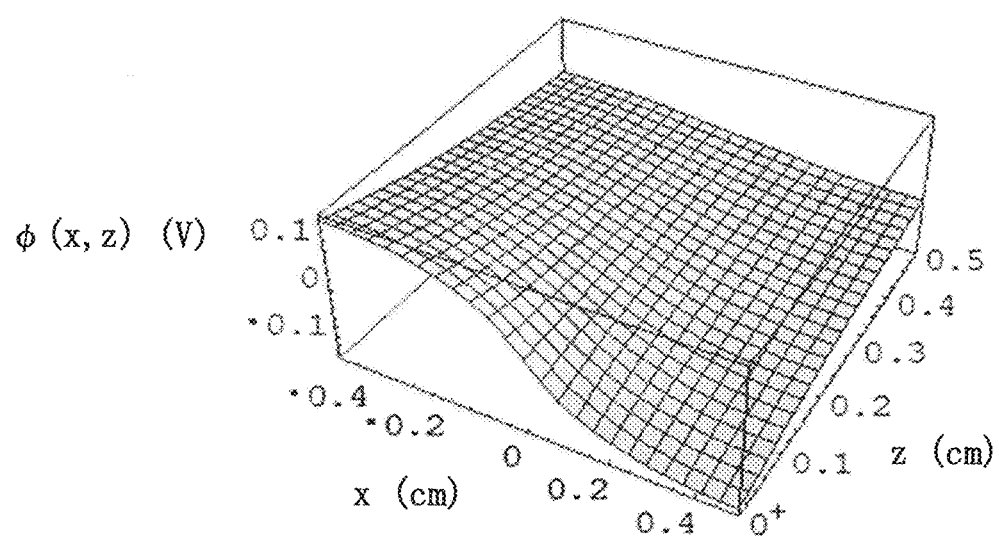
FIG. 8B is a view illustrating the local proton current density and the variation in potential $\varphi(x, z)$ attributable to specific resistance $\rho_{H+}$, obtained when the resistance component according to proton propagation was considered as an ohmic resistor, in the cell for chemical reaction using the interdigitated-type electrodes.

FIG. 8A and FIG. 8B show change in the local proton current density $j_{H+}(x, 0^+)$ of the electrode 102 for reduction reaction and the electrode 104 for oxidation reaction when 3.2584 V was applied as the voltage V, and change (relative values) in $\varphi(x, z)$ attributable to specific resistance $\rho_{H+}$. The local proton current density $j_{H+}(x, 0^+)$ was almost constant in the electrode 102 for reduction reaction and the electrode 104 for oxidation reaction. Since reaction resistance increases as the local proton current density $j_{H+}(x, 0^+)$ increases, a voltage drop occurs, and an increase in the local proton current density $j_{H+}(x, 0^+)$ is suppressed. In the change in the potential $\varphi(x, 0^+)$, the potential $\varphi(x, 0^+)$ in the vicinity of the center is closer to 0 than are the end parts of the electrode 102 for reduction reaction and the electrode 104 for oxidation reaction (x=±0.5 cm). In contrast with this result, if the reaction resistance is zero, the potential $\varphi(x, 0^+)$ in the electrode 102 for reduction reaction and the electrode 104 for oxidation reaction is constant, and as a result, the local proton current density $j_{H+}(x, 0^+)$ is high in the vicinity of the center in which the distance between them is short and the resistance is small.

If the concentration of the phosphoric acid buffer increases, since the specific resistance $\rho_{H+}$ decreases, the current density-voltage ($j_{ac}$-$V_{ac}$) characteristic is influenced. If the concentration doubles to 0.8 M, the specific resistance $\rho_{H+}$ becomes half of 14 Ω·cm. However, in the facing-type electrodes and the interdigitated-type electrodes, since the distances L between the electrodes and the cycles d were set such that the influence of the specific resistance $\rho_{H+}$ is minor, the current density $j_{ac}$ (L=1) and the current density $j_{ac}$ (d=1) increased just slightly, as shown in FIG. 7B. Meanwhile, since the influence of the specific resistance $\rho_{H+}$ on the large-sized cell of the related art decreased, the current density $j_{ac}$ (D=20) increased; however, it just increased to about half of the current density $j_{ac}$ (L=1) and the current density $j_{ac}$ (d=1).

In the case where the electrode 102 for reduction reaction and the electrode 104 for oxidation reaction were doubled by improving the catalyst performance of the electrode 102 for reduction reaction and the electrode 104 for oxidation reaction, or making the surfaces uneven, or using a porous base material to increase the effective surface areas, as shown in FIG. 7C, the current density $j_{ac}$ nearly doubled. However, due to the increase in the specific resistance $\rho_{H+}$, the current density didn't completely double. Meanwhile, the current density $j_{ac}$ (D=20) also increased; however, since the influence of the specific resistance $\rho_{H+}$ was remarkable, the current density improved just slightly. As a result, the characteristic of the interdigitated-type electrodes was superior.

<Integrated-Type Chemical Reactor>

Figure 9:
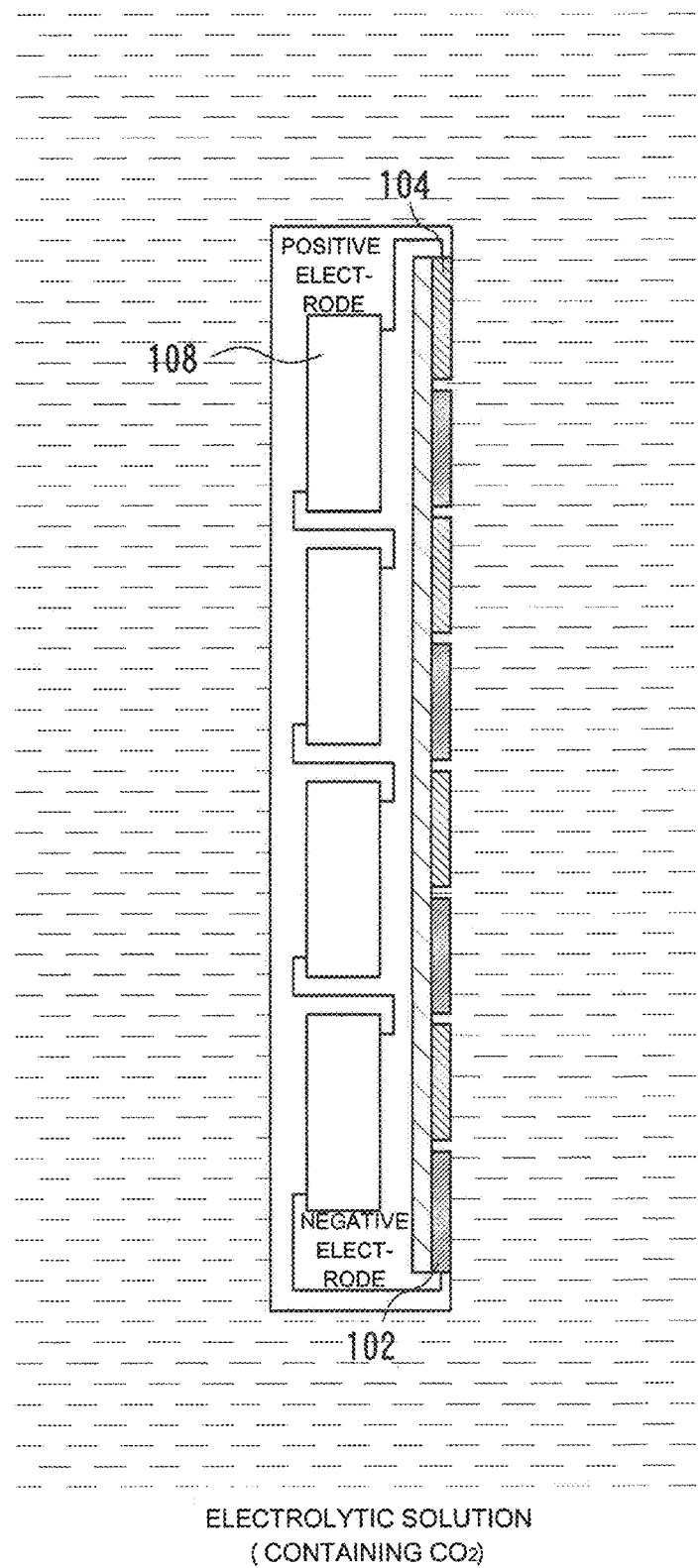
FIG. 9 is a view illustrating the configuration of an integrated-type chemical reactor according to the embodiment of the present disclosure.

As shown in FIG. 9, it is also possible to configure the integrated-type chemical reactor 100 by combining the interdigitated-type electrodes and a photocharge separation device (a solar cell). In the integrated-type chemical reactor 100, although the electrode area is half of that in the case where an electrode for oxidation reaction and an electrode for reduction reaction are formed on both sides of a photocharge separation device (a solar cell), high operating current $j_{op}$; i.e., high reaction efficiency, is obtained. Here, the operating current $j_{op}$ is influenced by the widths of the electrode 102 for reduction reaction and the electrode 104 for oxidation reaction, but does not depend on the external appearance of the chemical reactor 100. Therefore, if a sufficient amount of electrolytic solution is supplied, it is possible to prevent a decrease in the efficiency from being caused by an increase in the size.

As described above, for an artificial photosynthesis operation, it is necessary to apply 2V or a higher voltage between the electrode 102 for reduction reaction and the electrode 104 for oxidation reaction. Therefore, consideration is given to using an element having a plurality of crystalline silicon solar cells connected in series.

The current density-voltage ($j_{pv}$-$V_{pv}$) characteristic of a crystalline silicon solar cell can be expressed as Equation 10. Here, q, $k_B$, and T represent elementary charge, the Boltzmann constant, and the temperature (300 K), respectively, and $j_{ph}$ represents the photocurrent density, and $j_0$ and n represent the reverse saturation current and ideal factor of a diode, respectively.

$$j_{pv}=j_{ph}-j_0 \exp[qV_{pv}/(nk_BT)] \quad \text{[Equation 10]}$$

Figure 10A:
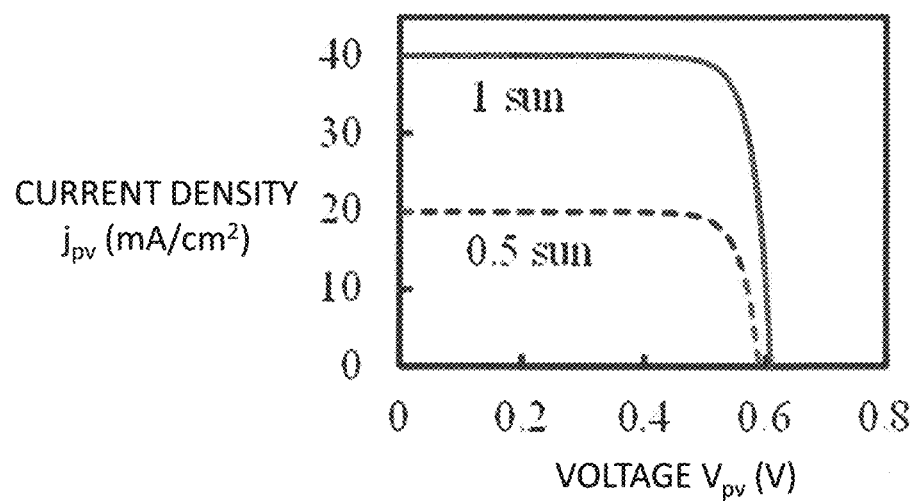
FIG. 10A is a view illustrating an example of the relationship between current density and output voltage in a crystalline silicon solar cell.
Figure 10B:
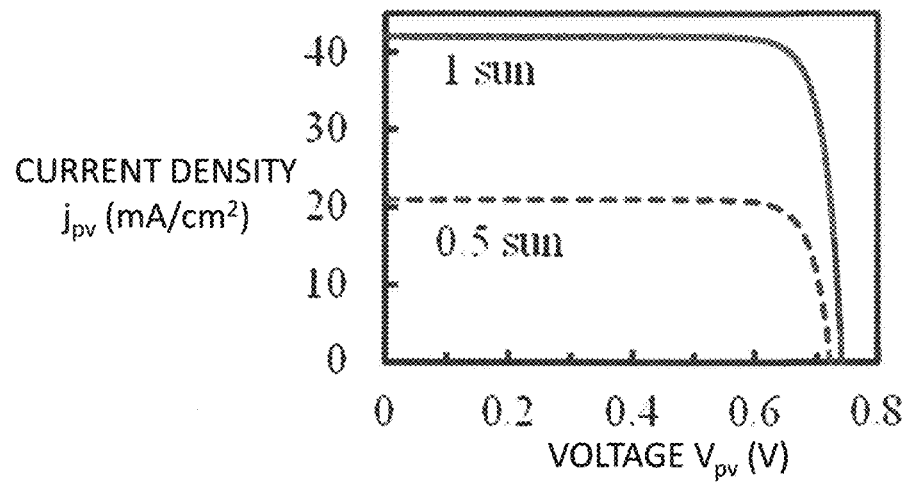
FIG. 10B is a view illustrating an example of the relationship between current density and output voltage in an amorphous silicon/crystalline silicon heterojunction solar cell.

When such values as those during irradiation with light having the intensity of 1 sun (the intensity of 100 mW/cm$^2$) under AM 1.5 G condition which is the standard condition of sunlight, the typical characteristics of commercial items can be obtained; $j_{ph}$, $j_0$, and n were 40 mA/cm$^2$, 2×10$^{-8}$, and 1.1, respectively, and at that time, the conversion efficiency, the open-end voltage, and the form factor were 19.9%, 0.61 V, and 0.82, respectively. FIG. 10A shows the current density-voltage ($j_{pv}$-$V_{pv}$) characteristic obtained at that time. Meanwhile, at present, silicon-based solar cells having the highest conversion efficiency are amorphous silicon/crystalline silicon heterojunction solar cells, and a conversion efficiency of 26% is achieved. At present, the manufacturing cost is high; however, they are expected to gradually spread in the future. Therefore, the case of using them is also considered. When the parameters of Equation 10 were determined such that a value close to the current density-voltage ($j_{pv}$-$V_{pv}$) characteristic reported in a literature can be obtained, $j_{ph}$, $j_0$, and n were 42 mA/cm$^2$, 2×10$^{-10}$, and 1.1, respectively, and in this case, the conversion efficiency, the open-end voltage, and the form factor were 26.2%, 0.74 V, and 0.84, respectively. FIG. 10B shows the current density-voltage ($j_{pv}$-$V_{pv}$) characteristic obtained in that case. The feature of this case is that the open-end voltage is higher as compared to FIG. 10A.

The current density-voltage ($j_{pv}$-$V_{pv}$) characteristic in the case of connecting m-number of crystalline silicon solar cells in series in order to obtain a voltage necessary for artificial photosynthesis reaction can be expressed as Equation 11.

$$j_{pv}=(j_{ph}-j_0 \exp[qV_{pv}/(nk_BT)/m])/m \quad \text{[Equation 11]}$$

By solving the system of equations representing the current density-voltage ($j_{pv}$-$V_{pv}$) characteristic of a crystalline silicon solar cell and the current density-voltage ($j_{ac}$-

$V_{ac}$) characteristic of the chemical reactor 100 shown in FIGS. 7A to 7C, the current density at the operating point is obtained. The case of the integrated-type chemical reactor 100 using the interdigitated-type electrodes shown in FIG. 9 also can be similarly considered, and since each of the areas of the electrode 102 for reduction reaction and the electrode 104 for oxidation reaction is half of the area in a solar cell, the characteristic obtained by replacing the current density $j_{ac}$ with ½ of the current density $j_{ac}$ may be used.

Figure 11A:
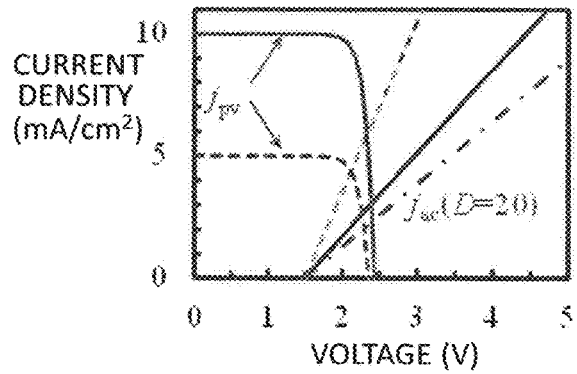
FIG. 11A is a view illustrating variation in the output characteristic of each of chemical reactors obtained by changing the number of solar cells which are connected in series.
Figure 11B:
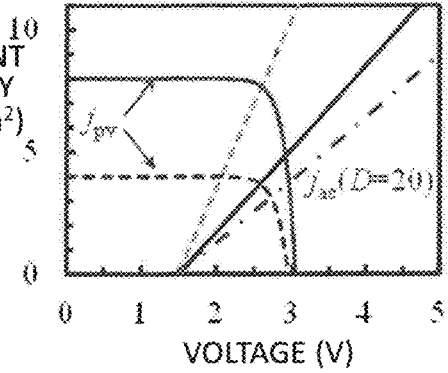
FIG. 11B is a view illustrating variation in the output characteristic of the chemical reactor with a change in the number of solar cells which are connected in series.
Figure 11C:
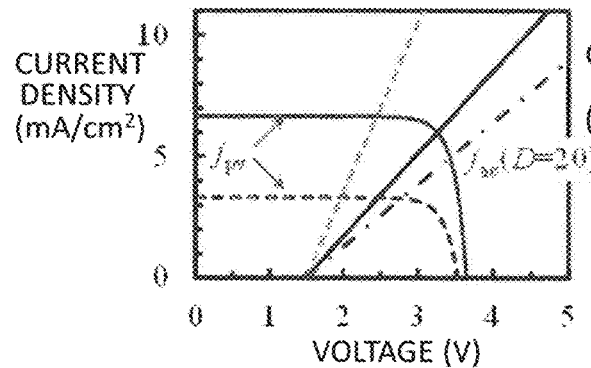
FIG. 11C is a view illustrating variation in the output characteristic of the chemical reactor with a change in the number of solar cells which are connected in series.
Figure 11D:
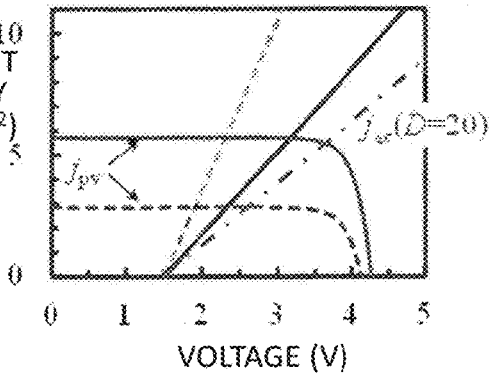
FIG. 11D is a view illustrating variation in the output characteristic of the chemical reactor with a change in the number of solar cells which are connected in series.
Figure 11E:
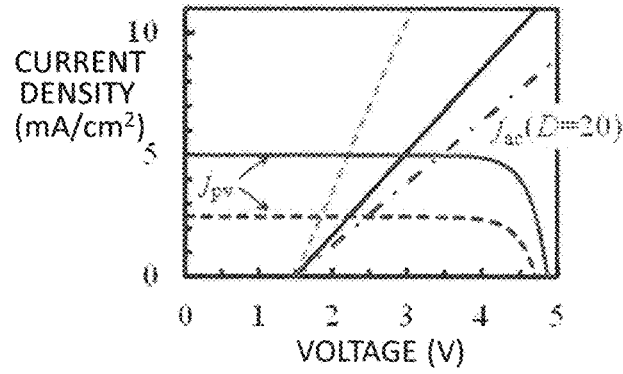
FIG. 11E is a view illustrating variation in the output characteristic of the chemical reactor with a change in the number of solar cells which are connected in series.

Each of FIG. 11A to FIG. 11E shows ½ of the current density $j_{ac}$ calculated from the current density-voltage ($j_{ac}$-$V_{ac}$) characteristic obtained when the cycle d was 1 cm, together with the current density $j_{ac}$ (L=1) obtained from the facing type of the related art which was a comparative example when the distance L between the electrodes was 1 cm, the current density $j_{ac}$ (D=20) obtained from the integrated type of the related art which was another comparative example, and the current density-voltage ($j_{pv}$-$V_{pv}$) characteristic of the solar cell. FIG. 11A shows the characteristics obtained when the number of crystalline silicon solar cells connected in series was 4. Similarly, FIG. 11B to FIG. 11E show the characteristics obtained when the number of crystalline silicon solar cells connected in series were 5, 6, 7, and 8, respectively. Also, FIG. 12A shows the current density (per unit area of the solar cells) at the operating point in each of FIG. 11A to FIG. 11E which is the intersection of the graph of the current density-voltage ($j_{ac}$-$V_{ac}$) characteristic of the chemical reactor 100 and the graph of the current density-voltage ($j_{pv}$-$V_{pv}$) characteristic of the solar cells.

The optimum value for "m"; i.e., the number of crystalline silicon solar cells which are connected in series, depends on the characteristics of the electrode 102 for reduction reaction and the electrode 104 for oxidation reaction and the specific resistance $\rho_{H+}$. If the voltage (threshold voltage) at which the current density $j_{ac}$ increases is low, and the inclination after the corresponding voltage is steep, the number of crystalline silicon solar cells which are connected in series; i.e., "m," can be set to be small. Therefore, a large operating-current density can be obtained. In the case where the number of crystalline silicon solar cells which are connected in series; i.e., "m," is small, the operating-current density depends on the current density $j_{ac}$. However, in the case where the number of crystalline silicon solar cells which are connected in series is large, the operating-current density is determined on the basis of the current density $j_{pv}$. The operating current becomes maximum when the operating point which is the intersection of the graph of the current density-voltage ($j_{ac}$-$V_{ac}$) characteristic of the chemical reactor 100 and the graph of the current density-voltage ($j_{pv}$-$V_{pv}$) characteristic of the solar cells is close to the maximum output point of the solar cells (the point at which the product of the current density $j_{pv}$ and the voltage $V_{pv}$ is maximum). In the case of the chemical reactor using the small-sized facing-type electrodes of the related art, when the number of crystalline silicon solar cells connected in series; i.e., "m," was 5, the operating current was maximum, and the maximum operating current was 7.7 mA/cm². Meanwhile, in the case of the chemical reactor 100 using the interdigitated-type electrodes according to the present embodiment, when the number of crystalline silicon solar cells which are connected in series; i.e. "m," was 5, the current density was low, and when the number of crystalline silicon solar cells which are connected in series; i.e., "m," is 6, the operating current was maximum, and the maximum operating current was 6.0 mA/cm². This operating current value was close to the maximum value obtained in the case of the chemical reactor using the small-sized electrodes of the related art.

Meanwhile, in the case of the chemical reactor using the integrated-type electrodes of the related art (diameter D=20 cm), when the number of crystalline silicon solar cells which are connected in series; i.e., "m," is 7, the operating current was 5.5 mA/cm², smaller than the value obtained in the case of the integrated-type chemical reactor 100 using the interdigitated-type electrodes. Also, in the chemical reactor using the integrated-type electrodes of the related art, since light absorption of the electrode 104 for oxidation reaction formed on the light incident surface side of the solar cells is not usually neglectable in practice, the operating current $j_{op}$ is smaller. Also, as the diameter D increases, the operating current $j_{op}$ decreases. In contrast, the integrated-type chemical reactor 100 using the interdigitated-type electrodes according to the present embodiment has the feature that the operating current $j_{op}$ does not depend on the external appearance of cells, so it is a suitable structure for configuring large-sized cells. Also, as described above, if the facing-type electrodes are large, since it is difficult to uniformly circulate a sufficient amount of electrolytic solution, there is a risk that the operating current $j_{op}$ will decrease.

If the intensity of incident light decreases, since the short-circuit current value of each solar battery decreases, the operating point changes to the low-current constant-voltage side. For this reason, the optimum value for "m"; i.e., the number of crystalline silicon solar cells which are connected in series, decreases. As shown in FIG. 12B, in the case of irradiation with light having the intensity of 0.5 sun, the case where the number of crystalline silicon solar cells which are connected in series; i.e., "m," was 5 was the best (in this case, the maximum operating current; i.e., 3.7 mA/cm², was obtained). In this case, the difference between the chemical reactor using the facing-type electrodes of the related art and the chemical reactor 100 using the interdigitated-type electrodes according to the present embodiment was little.

As described above, the cell feature and superiority of each configuration depends on the intensity of incident light. For this reason, in terms of the amount of charge which is generated for one day, the above-described configurations are compared. Regardless of change in the spectrum for one day, in view of change in the altitude of the sun, the change $I_{sun}(t)$ in the amount of solar radiation is expressed as a simple cosine curve like Equation 12.

$$I_{sun}(t)=\cos((t-12)\pi/24) \quad 6 \leq t \leq 18 \text{ (hours)} \quad \text{[Equation 12]}$$

Figure 13A:
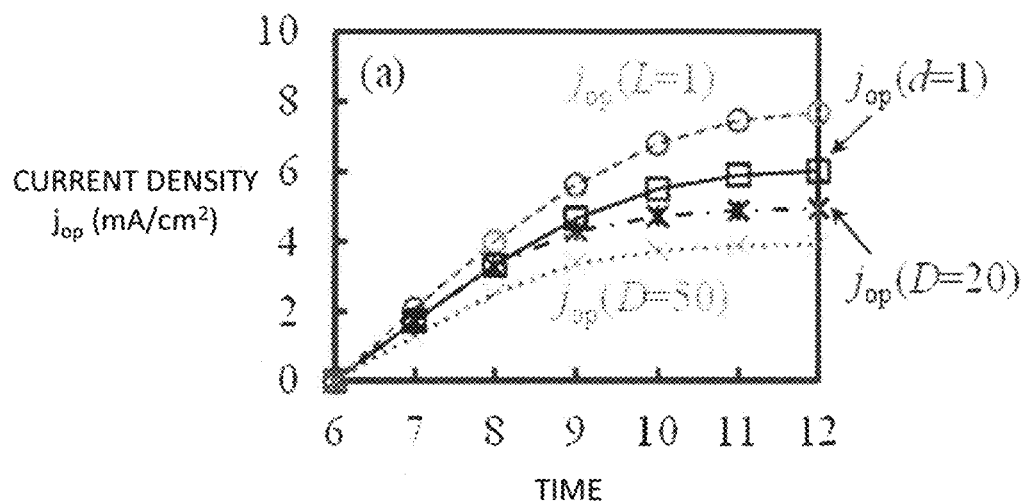
FIG. 13A is a view illustrating variation in operating current obtained in the case where time change was considered.
Figure 13B:
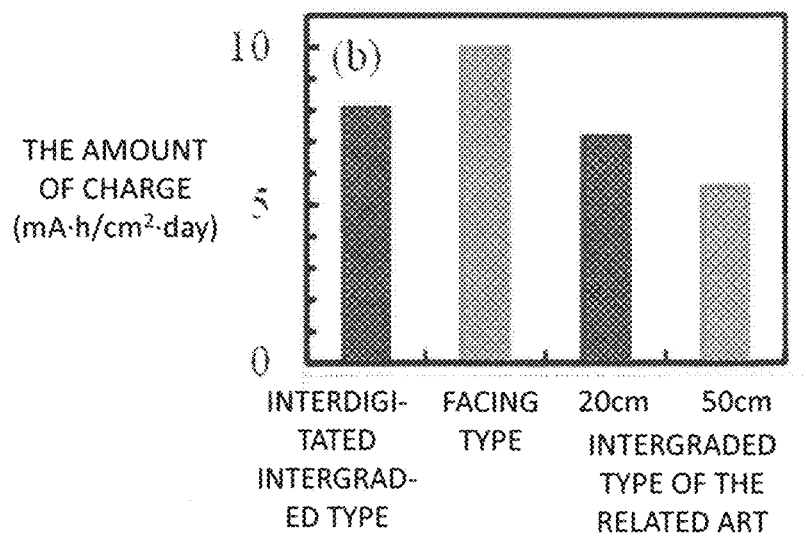
FIG. 13B is a view illustrating the amount of charge for one day obtained in the case where time change was considered.

FIG. 13A shows the results obtained by calculating the operating current $j_{op}$ corresponding to the intensity of solar radiation at each time point. In each chemical reactor, the number of solar cells connected in series was the optimum value, and in a chemical reaction using facing-type electrodes of the related art (wherein the distance L between the electrodes was 1 cm), the number of solar cells connected in series; i.e., "m," was 5, and in a chemical reactor using integrated-type electrodes of the related art (wherein the diameter D was 20 cm), and an integrated-type chemical reactor 100 using interdigitated-type electrodes (wherein the cycle d was 1 cm and the interval w was 0.1 cm), the number of solar cells connected in series; i.e., "m," was 6. Also, with respect to chemical reactors using integrated-type electrodes according to the related art in which the diameter D is 50 cm, similar calculations were performed, and the configuration in which the number of solar cells connected in series; i.e., "m," were 8 was the best. By integrating the operating current $j_{op}$ obtained as described above for time t, as shown in FIG. 13B, the amount of charge for one day can be obtained. The amount of charge obtained by using the interdigitated-type electrodes exceeds the amount of charge obtained by using the integrated-type electrodes according to the related art (the diameter D was 20 cm) by about 10%. Also, when the integrated-type electrodes (the diameter D was 50 cm) of the related art were used, the amount of charge was smaller.

Figure 14A:
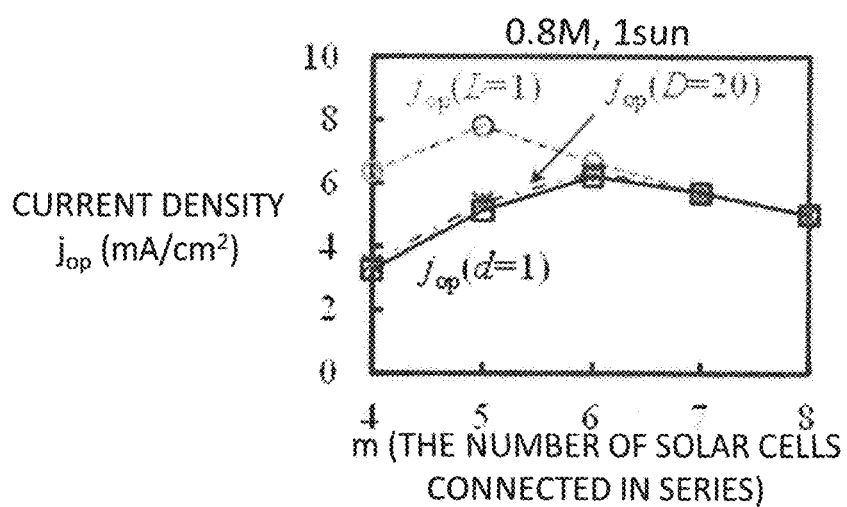
FIG. 14A is a view illustrating the relationship between the number of solar cells connected in series and current density at the operating point, obtained under various conditions.
Figure 14B:
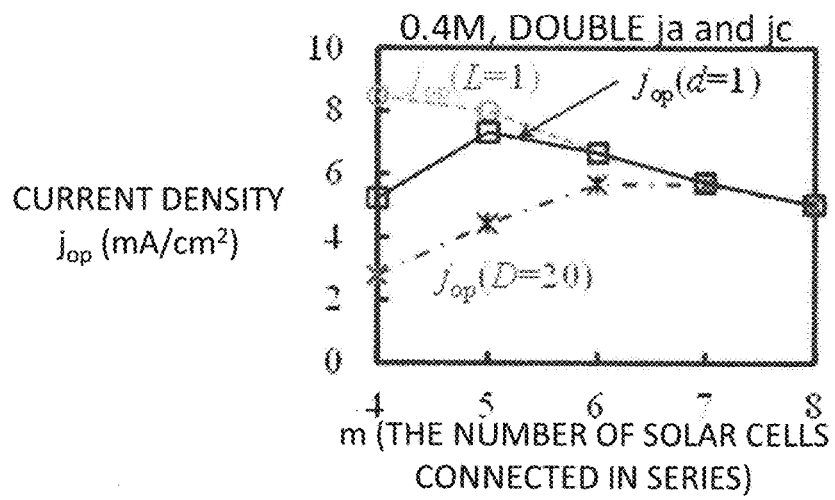
FIG. 14B is a view illustrating the relationship between the number of solar cells connected in series and current density at the operating point, obtained under various conditions.

FIG. 14A and FIG. 14B show the results obtained by calculating the operating current $j_{op}$ with respect to the configuration in which the concentration of the phosphoric acid buffer was 0.8 M and the configuration in which the current densities of the electrode 102 for reduction reaction and the electrode 104 for oxidation reaction were double, which exhibited the current density-voltage ($j_{ac}$-$V_{ac}$) characteristics shown in FIGS. 7B and 7C, respectively. In each of the integrated-type chemical reactor 100 using the interdigitated-type electrodes and the chemical reactor using the facing-type electrodes, in the case where the concentration of the phosphoric acid buffer was 0.8 M, as compared to the case of 0.4 M, the operating current $j_{op}$ became larger by about 0.2 mA/cm$^2$, but the dependency on the number of solar cells connected in series; i.e., "m," was kept. Meanwhile, in the chemical reactor using the integrated-type electrodes according to the related art, the current density $j_{ac}$ increased significantly, and the maximum value of the operating current $j_{op}$ (6.4 mA/cm$^2$ obtained when the number of solar cells connected in series; i.e., "m," was 6) was slightly larger than the value obtained from the chemical reactor 100 using the interdigitated-type electrodes (6.2 mA/cm$^2$ obtained when the number of solar cells connected in series; i.e., "m," was 6). However, as described above, there is a disadvantage that it is impossible to avoid the influence of the dependency on the diameter D and light absorption of the electrode 102 for reduction reaction.

In contrast with this, in the case of the integrated-type chemical reactor 100 using the interdigitated-type electrodes, when the current densities of the electrode 102 for reduction reaction and the electrode 104 for oxidation reaction were double, the case where the number of solar cells connected in series; i.e., "m," was 5 was the best, and in that case, the operating current $j_{op}$ increased to 7.3 mA/cm$^2$. Meanwhile, in the case of the chemical reactor using the integrated-type electrodes according to the related art, as shown in FIG. 7C, the value slightly increased from the value of FIG. 12A. In other words, as compared to the case of using the integrated-type electrodes according to the related art, the superiority of the integrated-type chemical reactor 100 using the interdigitated-type electrodes was more remarkable when the electrode 102 for reduction reaction and the electrode 104 for oxidation reaction became more active.

Figure 14C:
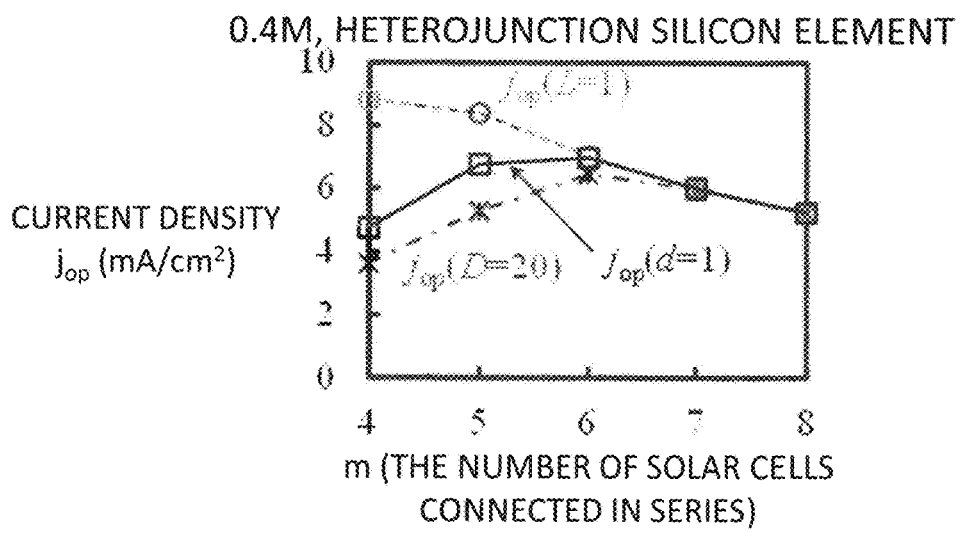
FIG. 14C is a view illustrating the relationship between the number of solar cells connected in series and current density at the operating point, obtained under various conditions.

Also, the characteristics also depended on the characteristics of photocharge separation elements. FIG. 14C shows the results obtained in the case of using heterojunction silicon batteries. In the integrated-type chemical reactor 100 using the interdigitated-type electrodes, when the number of solar cells connected in series; i.e., "m," was 6, the current density was the best, and was not significantly different from the value obtained when the number of solar cells connected in series; i.e., "m," was 5, unlike the case shown in FIG. 12A. Also, in the case where six crystalline silicon elements were connected in series, as shown in FIG. 12A, at the operating point, the current density was slightly lower than the short-circuit current density of solar cells; whereas in the case where six heterojunction silicon elements were connected in series, the current density was maintained at a value close to the short-circuit current density until a higher voltage, so a high operating current $j_{op}$ (6.9 mA/cm$^2$) was obtained.

As described above, in the chemical reactor 100 using the interdigitated-type electrodes, by appropriately selecting the number of solar cells to be connected in series; i.e., "m," according to the characteristics of the electrode 102 for reduction reaction and the electrode 104 for oxidation reaction, the concentration of the electrolytic solution, and the characteristics of solar cells to be combined, it is possible to configure chemical reactors larger than chemical reactors using integrated-type electrodes according to the related art, and it is possible to obtain operating currents $j_{op}$ close to those of chemical reactors using facing-type electrodes.

Also, according to the chemical reactor 100 of the present embodiment, it is possible to make protons smoothly flow from the electrode 104 for oxidation reaction to the electrode 102 for reduction reaction while circulating a sufficient amount of electrolytic solution to supply a sufficient amount of raw materials (including $CO_2$) and quickly discharge products (including HCOOH).

Second Embodiment

In the above-described embodiment, the cycle $d_c$ of the electrode 102 for reduction reaction and the cycle $d_a$ of the electrode 104 for oxidation reaction are set to be the same. However, the cycle $d_c$ and the cycle $d_a$ may be set to be different from each other, depending on the levels of chemical activity of the electrode 102 for reduction reaction and the electrode 104 for oxidation reaction. Specifically, it is preferable to set a larger width for one of the electrode 102 for reduction reaction and the electrode 104 for oxidation reaction having a lower level of chemical activity per unit area, and set a smaller width for the other electrode having a higher level of activity, for a balance between them.

Figure 15A:
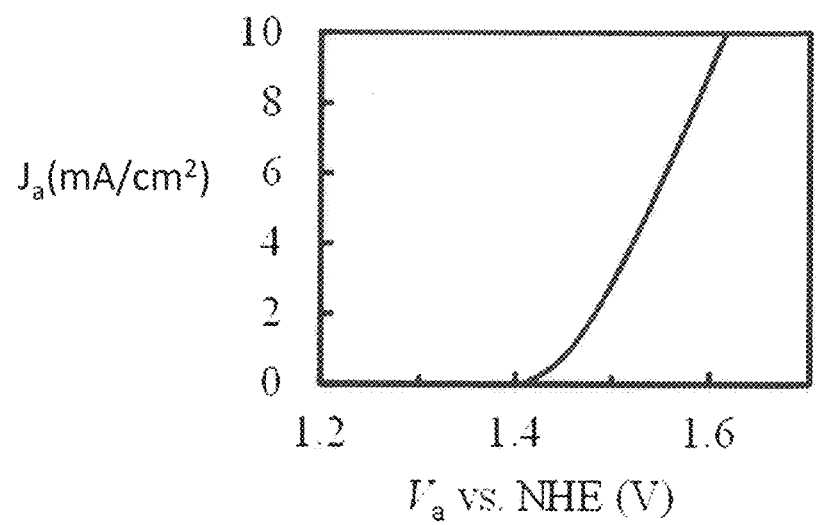
FIG. 15A is a view illustrating an example of the relationship between the current density and potential of the electrode for oxidation reaction.
Figure 15B:
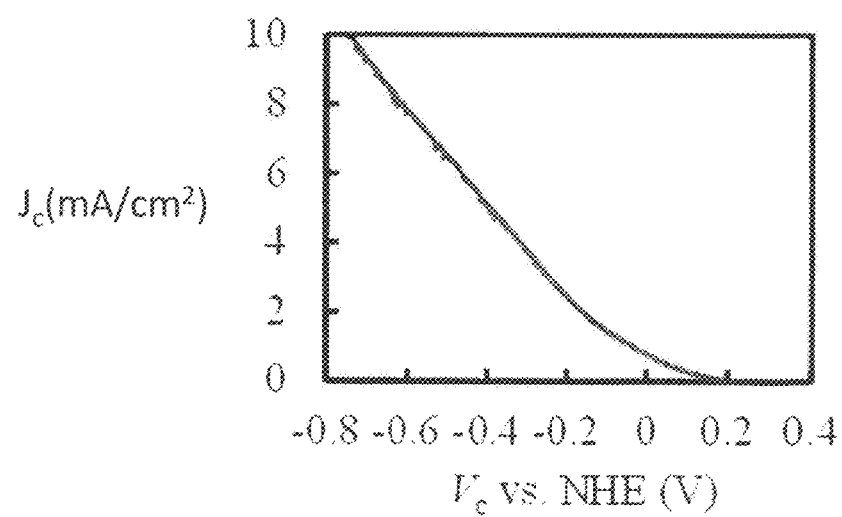
FIG. 15B is a view illustrating an example of the relationship between the current density and potential of the electrode for reduction reaction.

As described above, the functions of catalysts can be determined widely according to their materials, their supports, and their production processes. The characteristics of the electrode for reduction reaction and the electrode for oxidation reaction shown in FIG. 5A and FIG. 5B were compared with the characteristics disclosed in literature (T. Arai, S. Sato, and T. Morikawa, Energy Envision. Sci 8, 1998 (2015)). The characteristics of the electrodes for reduction reaction were almost the same. However, in the case of the electrodes for oxidation reaction, although their thresholds were the same, the current density of the electrode for oxidation reaction during a voltage larger than the threshold, disclosed in the literature, was about three times. For this reason, the case where only the current density of the electrode for oxidation reaction is three times the current density shown in FIG. 5A, as shown in FIG. 15A and FIG. 15B, was examined.

In this case, the differential resistance $dV_a/dj_a$ of the electrode for oxidation reaction during reaction and the differential resistance $dV_c/dj_c$ of the electrode for reduction reaction during reaction are 14 Ω·cm and 73 Ω·cm (which are absolute values), respectively. In other words, the differential resistance of the interdigitated-type electrodes is significantly larger than the differential resistance of the electrode for oxidation reaction. Therefore, in the case where the total area of an electrode for reduction reaction and an electrode for oxidation reaction is limited, like interdigitated electrodes, if the area of the electrode for reduction reaction is set to be relatively large, it is possible to increase the current value per total area.

Figure 16:
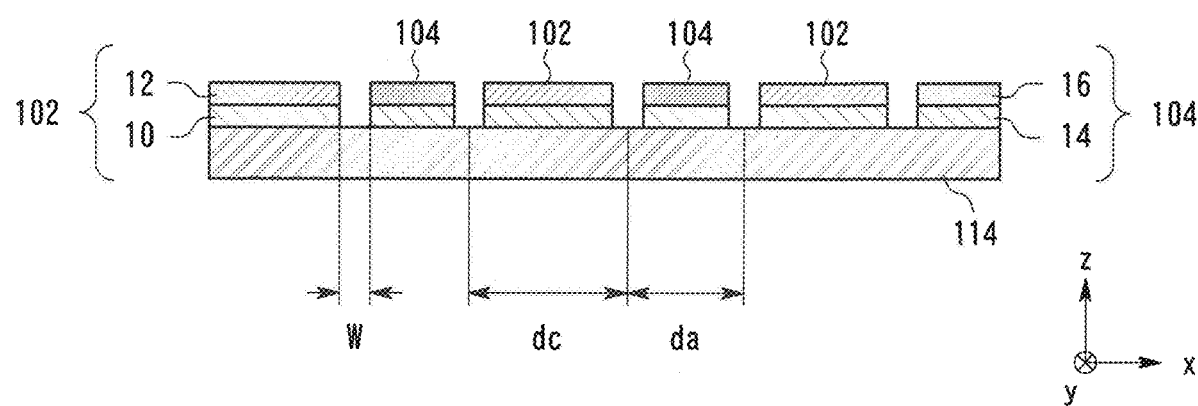
FIG. 16 is a cross-sectional view illustrating an electrode for reduction reaction and an electrode for oxidation reaction according to another embodiment (a second embodiment) of the present disclosure.

It is assumed that, as shown in FIG. 16, the width of the electrode 104 for oxidation reaction is da-w/2 and the width of the electrode 102 for reduction reaction is dc-w/2. Equation 5 to Equation 9 are changed to Equation 13 to Equation 17.

$$j_{H+}^{(y)}(x,0^+) = j_a(\varphi(x,0) - \varphi(x,0^+) + V_{a0}), -d_a/2 < x < -w/2 \quad \text{[Equation 13]}$$

$$j_{H+}^{(y)}(x,0^+) = j_c(\varphi(x,0) - \varphi(x,0^+) + V_{c0}), w/2 < x < d_c/2 \quad \text{[Equation 14]}$$

$$j_{ac} = (d_a + d_c)/2 = j_{H+a} d_a = j_{H+c} d_c \quad \text{[Equation 15]}$$

$$j_{H+a} = 2\int_{-d_a/2}^{-w/2} dx \, j_{H+}^{(y)}(x,0^+)/d_a \quad \text{[Equation 16]}$$

$$j_{H+c} = 2\int_{w/2}^{d/2} dx \, j_{H+}^{(y)}(x,0^+)/d_c \quad \text{[Equation 17]}$$

Figure 17A:
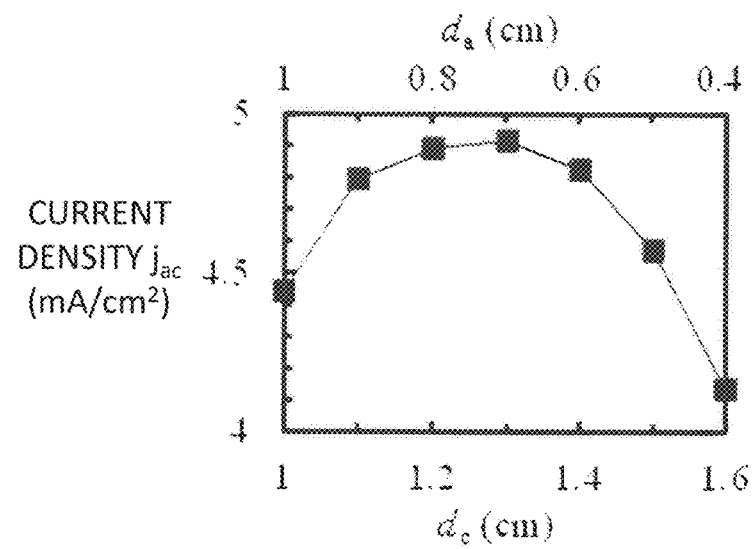
FIG. 17A is a view illustrating the current density, the overvoltage, and the current density-voltage characteristic obtained in the case where the widths of the electrode for reduction reaction and the electrode for oxidation reaction were changed.

FIG. 17A shows the result obtained by changing the cycle $d_a$ and the cycle $d_c$ within a range in which the sum of the cycle $d_a$ of the electrode 104 for oxidation reaction and the cycle $d_c$ of the electrode 102 for reduction reaction is 2 cm, and applying 2V as a constant voltage $V_{ac}$, and calculating the current density $j_{ac}$. In the case of using an asymmetric type having the optimum cycle $d_a$ of 0.7 cm and the optimum cycle $d_c$ of 1.3 cm, there is obtained a current density $j_{ac}$ that is about 10% larger than the current density in the case where both of the cycle $d_a$ and the cycle $d_c$ are 1 cm. Also, configuring asymmetrically is considered as not particularly having disadvantages.

If the overvoltage of the electrode 102 for reduction reaction and the electrode 104 for oxidation reaction (the difference between the oxidation potential and the threshold potential at which reaction occurs) increases, catalyst deterioration may progress, or the reaction selectivity may be damaged. In the case where reduction reaction from carbon dioxide ($CO_2$) to formic acid (HCOOH) at the electrode 102 for reduction reaction is intended, if overvoltage is larger, other materials such as carbon monoxide (CO) may be produced, or in an acetonitrile solution, water ($H_2O$) may be reduced, resulting in production of hydrogen ($H_2$).

The average overvoltage $V_{op-a}$ of the electrode 104 for oxidation reaction and the average overvoltage $V_{op-c}$ of the electrode 102 for reduction reaction can be expressed by Equation 18 and Equation 19, respectively.

$$V_{op-a} = 2\int_{-\frac{d_a}{2}}^{-\frac{w}{2}} dx(\varphi(x,0) - \varphi(x,0^+))/(d_a - w) \quad \text{[Equation 18]}$$

$$V_{op-c} = 2\int_{\frac{w}{2}}^{\frac{d_c}{2}} dx(\varphi(x,0) - \varphi(x,0^+))/(d_c - w) \quad \text{[Equation 19]}$$

Figure 17B:
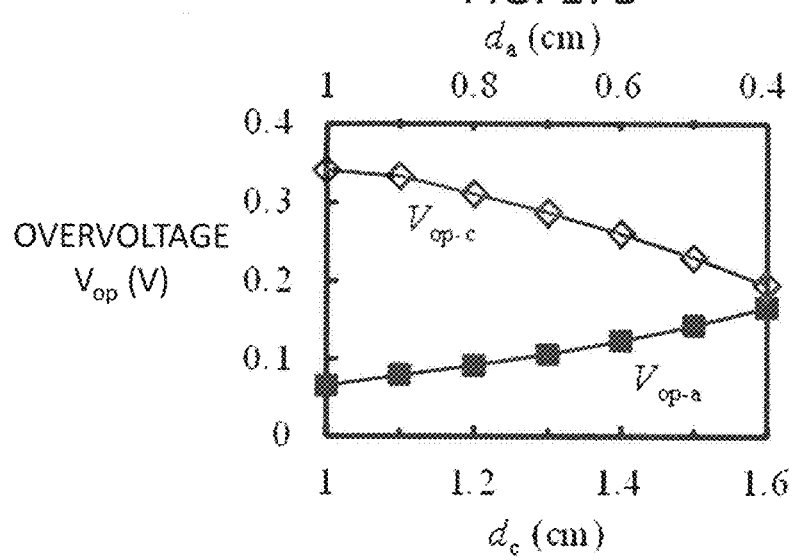
FIG. 17B is a view illustrating the current density, the overvoltage, and the current density-voltage characteristic obtained in each of the electrode for reduction reaction and the electrode for oxidation reaction in the case where their widths are changed.
Figure 17C:
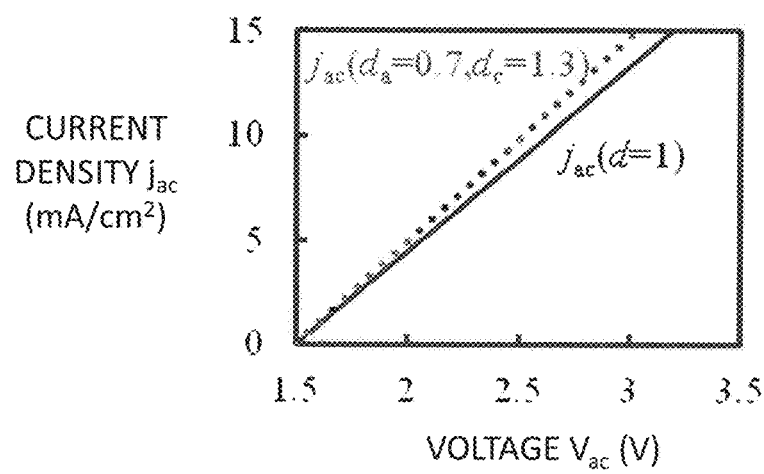
FIG. 17C is a view illustrating the current density, the overvoltage, and the current density-voltage characteristic, obtained in the case where the widths of the electrode for reduction reaction and the electrode for oxidation reaction were changed.

FIG. 17B shows the overvoltage $V_{op-a}$ and the overvoltage $V_{op-c}$ which are obtained corresponding to FIG. 17A when the voltage Vac is 2V. As the electrode 102 of which the differential resistance during reaction is large widens, since the overvoltage $V_{op-c}$ decreases and the overvoltage $V_{op-a}$ increases slightly, the above-mentioned problems; i.e., deterioration and reduction in reaction selectivity decrease. FIG. 17C shows the current density-voltage ($j_{ac}$-$V_{ac}$) characteristics (shown by $j_{ac}$ (d=1) and $j_{ac}$ (da=0.7, dc=1.3), respectively) which are obtained in the case of the asymmetric type having the cycle d of 1 cm and the case of the asymmetric type having the optimum cycle $d_a$ of 0.7 cm and the optimum cycle $d_c$ of 1.3 cm.

FIGS. 18A to 18D show the results obtained by comparing local proton current density $j_{H+}^{(y)}(x,0^+)$ and variations (relative values) in potential $\varphi(x, z)$ attributable to the specific resistance $\rho_{H+}$, from interdigitated-type electrodes of a symmetric type (wherein the cycle d is 1 cm, and the interval w is 0.1 cm) by applying 2V as the voltage Vac, with local proton current density and variation in potential $\varphi(x, z)$ attributable to the specific resistance $\rho_{H+}$, from interdigitated-type electrodes of an asymmetric type (wherein the cycle $d_a$ is 0.7 cm, and the cycle $d_c$ is 1.3 cm, and the interval w is 0.1 cm) by applying 2V as the voltage Vac. In the case of the symmetric type, both of the average $j_{H+a}$ of the local proton current density $j_{H+}^{(y)}(x, 0^+)$ of the electrode for oxidation reaction and the average $j_{H+c}$ of the local proton current density $j_{H+}^{(y)}(x, 0^+)$ of the electrode for reduction reaction were 4.4 mA/$cm^2$, and in the case of the asymmetric type, the average $j_{H+a}$ was 7.0 mA/$cm^2$, and the average $j_{H+c}$ was 3.8 mA/$cm^2$. In each case, since the electrode 104 for oxidation reaction has higher activity (the absolute value of the differential resistance $dV_a/dj_a$ during reaction is smaller), the influence of the specific resistance $\rho_{H+}$ is relatively strong. Therefore, the local proton current density at the part close to the electrode 102 (the part close to x=0) for reduction reaction is higher, and the local proton current density at the part far from the electrode for reduction reaction is lower. In contrast, since the differential resistance $dV_a/dj_a$ dominates the electrode 102 for reduction reaction, the local proton current density $j_{H+}^{(y)}(x, 0^+)$ rarely depends on the distance from the electrode 104 for oxidation reaction.

Next, the characteristic of an integrated-type chemical reactor 100 using interdigitated-type electrodes of an asymmetric type is obtained. With respect to the electrode 102 for reduction reaction and the electrode 104 for oxidation reaction, it was assumed that the electrode 104 for oxidation reaction has significantly higher activity as shown in FIG. 15, and the current density-voltage ($j_{ac}$-$V_{ac}$) characteristic shown in FIG. 17C was used.

FIG. 19A and FIG. 19B show the current density $j_{op}$ (per unit area of solar cells) at the operating point of each of integrated-type chemical reactors each having m-number of crystalline silicon solar cells. When the intensity of incident light was 1 sun, in the case where the number of solar cells connected in series; i.e., "m," was 6, the current density $j_{op}$ was maximum; whereas when the intensity of incident light was 0.5 sun, in the case where the number of solar cells connected in series; i.e., "m," is 5, the current density $j_{op}$ was maximum. However, in the case of the asymmetric type, during irradiation with light having the intensity of 1 sun, the difference between the case where the number of solar cells connected in series; i.e., "m," was 5 and the case where the number of solar cells connected in series; i.e., "m," was 6 was small.

Figure 20A:
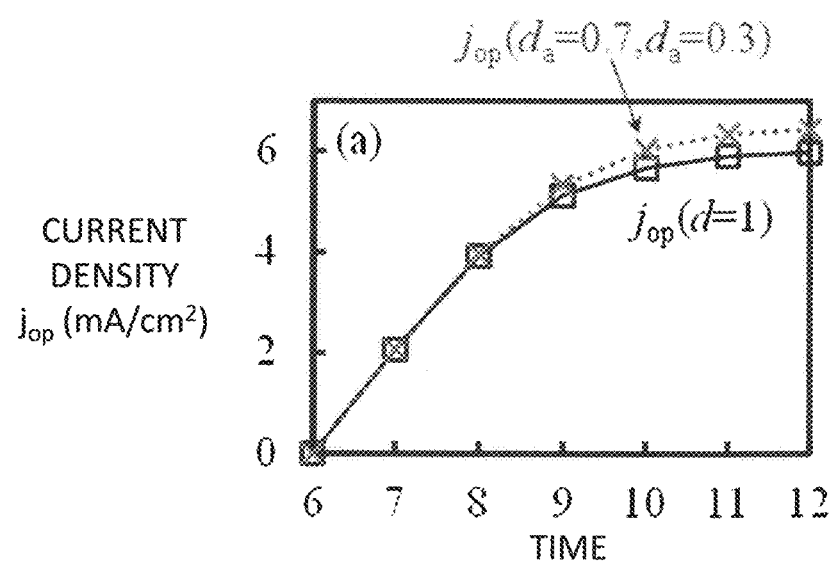
FIG. 20A is a view illustrating variations in operating current obtained in the case where time change was considered.
Figure 20B:
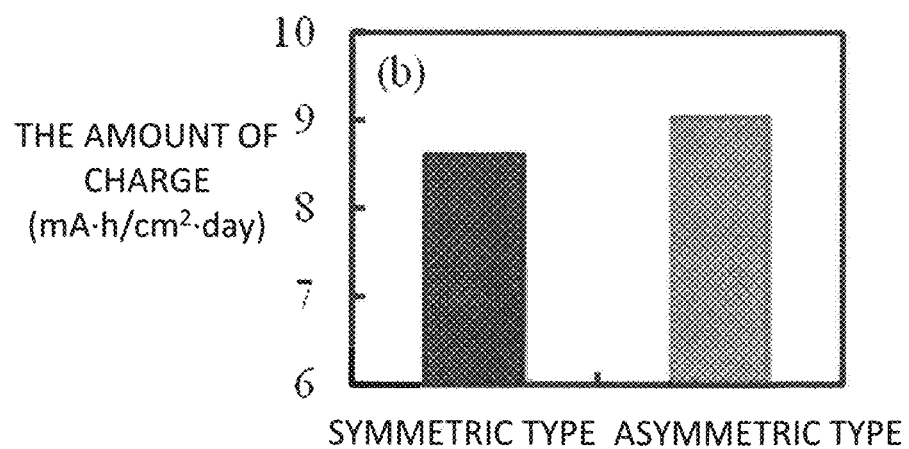
FIG. 20B is a view illustrating the amounts of charge for one day obtained in the case where time change was considered.

Reflecting them, in each of the symmetric type and the asymmetric type, the amount of charge generated for one day was maximum when the number of solar cells connected in series; i.e., "m," was 5. As shown in FIGS. 20A and 20B, when incident light was weak, the difference in the current density $j_{op}$ between the symmetric type and the asymmetric type was little; however, when the intensity of incident light was high, the current density of the asymmetric type (wherein the cycle $d_a$ is 0.7 cm, and the cycle $d_c$ is 1.3 cm, and the interval w is 0.1 cm) was superior. As a result, from the asymmetric type, an amount of charge larger than the amount of charge of the symmetric type (wherein the cycle d is 1 cm, and the interval w is 0.1 cm) by about 5% was obtained. Moreover, it is possible to reduce the problems; i.e., deterioration and reduction in reaction selectivity.

MODIFICATIONS

Figure 21:
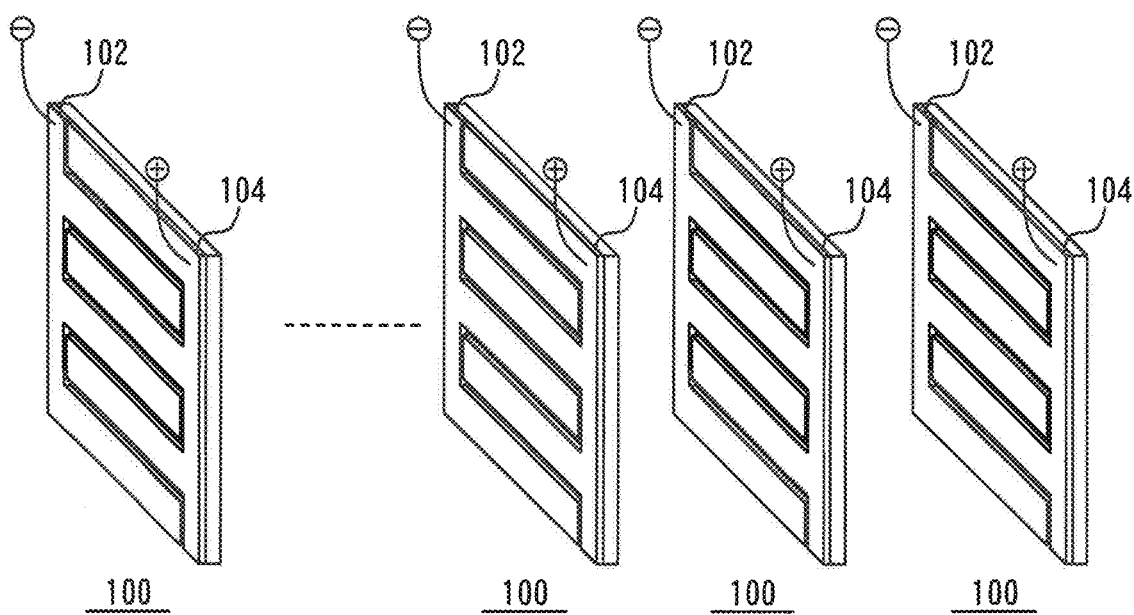
FIG. 21 is a view illustrating a configuration in the case where a plurality of chemical reactors are connected in parallel.
Figure 22A:
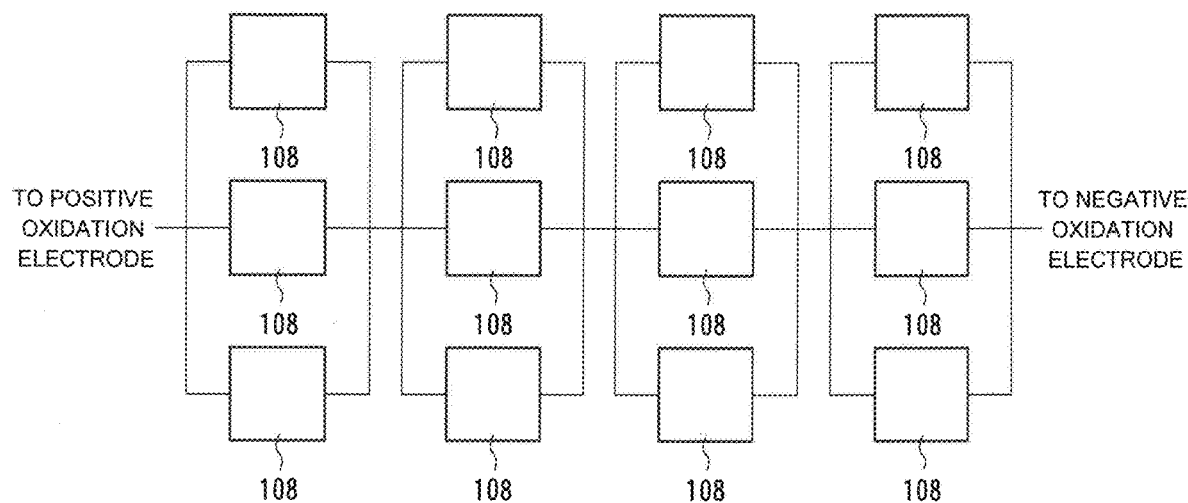
FIG. 22A is a view illustrating a configuration in the case where a plurality of chemical reactors in series and in parallel.
Figure 22B:
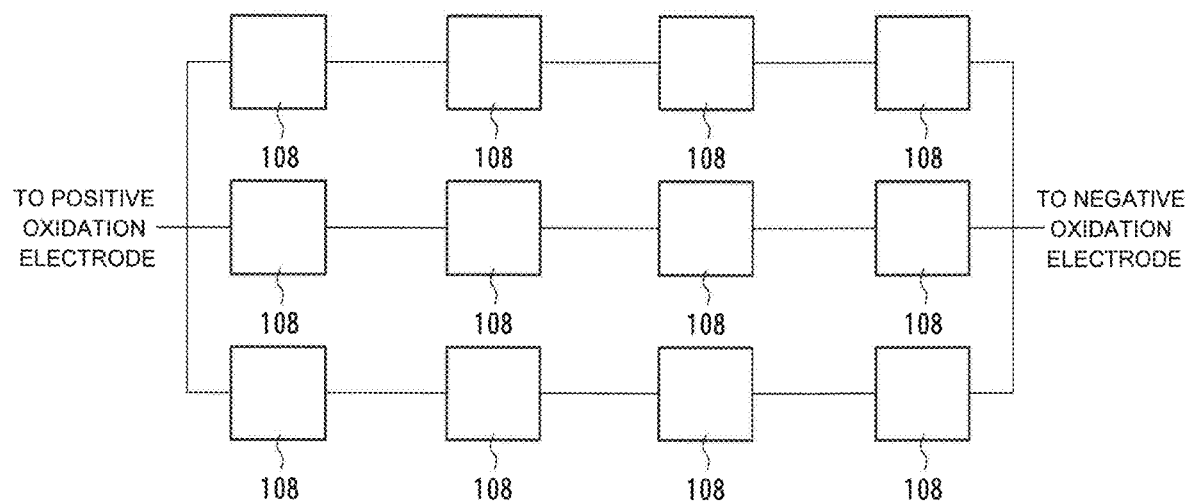
FIG. 22B is a view illustrating another configuration in the case where a plurality of chemical reactors are connected in series and in parallel.

FIG. 21 shows a configuration in which a plurality of chemical reactors 100 are connected in series. In this case, the plurality of chemical reactors 100 connected in series may be immersed, and voltage may be applied from a power supply (such as a solar cell). However, the way in which the plurality of chemical reactors 100 is connected is not limited thereto. For example, series combinations or series-parallel combinations of the plurality of chemical reactors 100 may be connected, and a voltage according to the number of combined circuits connected in series may be applied. In the case of using a solar cell as a power supply, according to the conditions such as the ground site, a plurality of solar cells 108 may be divided into series or parallel combinations and these combinations may be connected, as shown in FIG. 22A or FIG. 22B.

In the above-described embodiments and the modifications, interdigitated-type electrodes form one surface of each chemical reactor 100; however, interdigitated-type electrodes may form both surfaces.

The invention claimed is:

1. An electrode set for chemical reaction, comprising:
a substrate; and
an electrode for oxidation reaction and an electrode for reduction reaction that are alternately arranged on a same surface of the substrate, wherein
the electrode for oxidation reaction and the electrode for reduction reaction are each comprised of a toothed strip, and the electrode for oxidation reaction and the electrode for reduction reaction satisfy at least one of the following conditions:
(1) a length, in a direction perpendicular to a direction in which the electrodes are alternately arranged, of each toothed strip of the electrode for oxidation reaction and of the electrode for reduction reaction is larger than a width, in the direction in which the electrodes are alternately arranged, of two times a cycle of the respective electrode, or
(2) a width, in the direction in which the electrodes are alternately arranged, of the cycle of each of the electrode for oxidation reaction and the electrode for reduction reaction is 3 cm or less.

2. The cell for chemical reaction according to claim 1, wherein the electrode for oxidation reaction and the electrode for reduction reaction satisfy condition (1) but not condition (2).

3. The electrode set for chemical reaction according to claim 2, wherein:
the electrodes for oxidation and reduction reactions each have a width of 4 cm or less.

4. A cell for chemical reaction, comprising:
the electrode set for chemical reaction according to claim 3; and
at least one solar cell connected to the electrodes for oxidation and reduction reactions.

5. The cell for chemical reaction according to claim 4, wherein:
the at least one solar cell includes three to six crystalline silicon solar cells connected in series.

6. A cell for chemical reaction, comprising the cell for chemical reaction according to claim 4 immersed in an electrolytic solution.

7. A cell for chemical reaction, comprising the cell for chemical reaction according to claim 5 immersed in an electrolytic solution.

8. A cell for chemical reaction, comprising:
the electrode set for chemical reaction according to claim 1; and
at least one solar cell connected to the electrodes for oxidation and reduction reactions.

9. The cell for chemical reaction according to claim 8, which is an integrated type in which the at least one solar cell is a part of the base.

10. The cell for chemical reaction according to claim 9, wherein:
the at least one solar cell includes three to six crystalline silicon solar cells connected in series.

11. A cell for chemical reaction, comprising the cell for chemical reaction according to claim 9 immersed in an electrolytic solution.

12. A cell for chemical reaction, comprising the cell for chemical reaction according to claim 10 immersed in an electrolytic solution.

13. The cell for chemical reaction according to claim 8, wherein:
the at least one solar cell includes three to six crystalline silicon solar cells connected in series.

14. A cell for chemical reaction, comprising the cell for chemical reaction according to claim 13 immersed in an electrolytic solution.

15. A cell for chemical reaction, comprising the cell for chemical reaction according to claim 8 immersed in an electrolytic solution.

16. A chemical reactor comprising:
a plurality of the cells for chemical reaction according to claim 15, wherein
the electrodes for oxidation and reduction reactions are provided on one or both surfaces of each of the cells, and the surfaces on which the electrodes are provided are arranged facing each other.

17. The cell for chemical reaction according to claim 1, wherein the electrode for oxidation reaction and the electrode for reduction reaction satisfy condition (2) but not condition (1).

18. The cell for chemical reaction according to claim 1, wherein the electrode for oxidation reaction and the electrode for reduction reaction satisfy both condition (1) and condition (2).

* * * * *